United States Patent
Lax et al.

(10) Patent No.: US 7,140,489 B2
(45) Date of Patent: Nov. 28, 2006

(54) DENIAL SYSTEM FOR SECURING AN ASSET WITHIN A CONTAINER AND METHODS OF USE

(75) Inventors: Michael R Lax, Syosset, NY (US); Agjah I Libohova, Bayside, NY (US); Timothy J Keuning, Northport, NY (US); Frederik A van Koot, Halesite, NY (US)

(73) Assignee: Autronic Plastics, Inc., Westbury, NY (US)

( * ) Notice: Subject to any disclaimer, the term of this patent is extended or adjusted under 35 U.S.C. 154(b) by 111 days.

(21) Appl. No.: 10/810,937

(22) Filed: Mar. 26, 2004

(65) Prior Publication Data

US 2004/0188286 A1 Sep. 30, 2004

Related U.S. Application Data

(60) Provisional application No. 60/512,916, filed on Oct. 20, 2003, provisional application No. 60/458,033, filed on Mar. 26, 2003.

(51) Int. Cl.
 B65D 85/30 (2006.01)
 A45C 13/10 (2006.01)
 E05B 65/00 (2006.01)

(52) U.S. Cl. ............... 206/308.2; 206/1.5; 206/310; 206/807; 206/818; 70/57.1

(58) Field of Classification Search ............ 206/308.1, 206/308.2, 310, 493, 807, 818; 70/57.1, 70/63
See application file for complete search history.

(56) References Cited

U.S. PATENT DOCUMENTS

| 517,729 | A | 4/1894 | Cable |
| 1,626,898 | A | 5/1927 | Welk |
| 1,707,225 | A | 4/1929 | Jackson |
| 2,393,034 | A | 1/1946 | Ellis et al. |
| 2,730,392 | A | 1/1956 | Thiebaud et al. |
| 2,809,062 | A | 10/1957 | Mainhardt et al. |
| 2,825,483 | A | 3/1958 | Maron, Jr. |
| 2,916,901 | A | 12/1959 | Claud-Mantle |

(Continued)

FOREIGN PATENT DOCUMENTS

CN 1093055 10/1994

(Continued)

OTHER PUBLICATIONS

"Engineers Use I-DEAS to Help Prevent Thefts," Design News, Nov. 6, 1995.

(Continued)

*Primary Examiner*—Bryon P. Gehman
(74) *Attorney, Agent, or Firm*—Fish & Neave IP Group of Ropes & Gray LLP; Paul Leblond

(57) ABSTRACT

Benefit denial systems for securing an asset within a container and methods of use are provided. Such benefit denial systems of the present invention may include a benefit denial device that secures the asset within the container. The benefit denial device may include a base member and at least one locking member, and the asset may be secured therebetween. By securing the asset between the base member and a locking member, the asset will be rendered unusable if a thief attempts to remove the asset from the container. For example, if the asset is a storage medium such as a DVD, then the DVD will break if the thief attempts to remove the DVD from the confines of the benefit denial device.

3 Claims, 33 Drawing Sheets

U.S. PATENT DOCUMENTS

| | | |
|---|---|---|
| 3,095,723 A | 7/1963 | McKnight et al. |
| 3,230,749 A | 1/1966 | Manthorne |
| 3,232,421 A | 2/1966 | Young |
| 3,495,716 A | 2/1970 | Gregory |
| 3,497,908 A | 3/1970 | Zamarra |
| 3,515,423 A | 6/1970 | De Smidt |
| 3,685,684 A | 8/1972 | Schindler et al. |
| 3,763,994 A | 10/1973 | Somers |
| 3,828,922 A | 8/1974 | Holkestad |
| 3,837,525 A | 9/1974 | Kobayashi |
| 3,837,692 A | 9/1974 | Ayers et al. |
| 3,855,827 A | 12/1974 | Hallman et al. |
| 3,885,670 A | 5/1975 | Cousino |
| 3,904,259 A | 9/1975 | Hoffmann et al. |
| 3,933,240 A | 1/1976 | Humble |
| 3,933,381 A | 1/1976 | Schurman |
| 3,949,928 A | 4/1976 | Perkins |
| 3,951,264 A | 4/1976 | Heidecker et al. |
| 3,969,007 A | 7/1976 | Lowry |
| 3,994,416 A | 11/1976 | Mulligan |
| 3,994,551 A | 11/1976 | Ackeret |
| 4,046,255 A | 9/1977 | Ackeret |
| 4,084,690 A | 4/1978 | Pulse |
| 4,084,694 A | 4/1978 | Lainez et al. |
| 4,109,821 A | 8/1978 | Lutz |
| 4,153,178 A | 5/1979 | Weavers et al. |
| 4,176,744 A | 12/1979 | Borzak |
| RE30,184 E | 1/1980 | Ackeret |
| 4,184,594 A | 1/1980 | Hehn |
| 4,191,292 A | 3/1980 | Schweizer |
| 4,204,724 A | 5/1980 | Bauer et al. |
| 4,211,337 A | 7/1980 | Weavers et al. |
| 4,235,334 A | 11/1980 | Ahn |
| 4,239,108 A | 12/1980 | Coleman et al. |
| 4,266,784 A | 5/1981 | Torrington |
| 4,279,373 A | 7/1981 | Montealegre |
| 4,285,429 A | 8/1981 | MacTavish |
| 4,291,801 A | 9/1981 | Basili et al. |
| 4,293,266 A | 10/1981 | St. Lawrence et al. |
| 4,303,159 A | 12/1981 | Stone et al. |
| 4,314,637 A | 2/1982 | Posso |
| 4,314,643 A | 2/1982 | Forbes, Jr. |
| 4,341,307 A | 7/1982 | Shyers |
| 4,363,403 A | 12/1982 | Raucci, Jr. et al. |
| 4,365,711 A | 12/1982 | Long et al. |
| 4,365,712 A | 12/1982 | Oishi et al. |
| 4,379,507 A | 4/1983 | Llabres |
| 4,387,807 A | 6/1983 | De la Rosa |
| 4,399,913 A | 8/1983 | Gelardi et al. |
| 4,406,369 A | 9/1983 | Wallace et al. |
| 4,407,410 A | 10/1983 | Graetz et al. |
| 4,425,999 A | 1/1984 | MacDonald et al. |
| 4,445,634 A | 5/1984 | Sato |
| 4,453,743 A | 6/1984 | Sanders et al. |
| 4,463,849 A | 8/1984 | Prusak et al. |
| 4,463,850 A | 8/1984 | Gorog |
| 4,469,225 A | 9/1984 | Takahashi |
| 4,476,978 A | 10/1984 | Saito |
| 4,488,644 A | 12/1984 | Wynalda |
| 4,499,994 A * | 2/1985 | Rentch ................ 206/310 |
| 4,501,359 A | 2/1985 | Yoshizawa |
| 4,508,217 A | 4/1985 | Long et al. |
| 4,522,312 A | 6/1985 | Rathgeber et al. |
| 4,538,730 A | 9/1985 | Wu |
| 4,558,782 A | 12/1985 | Iverson et al. |
| 4,561,544 A | 12/1985 | Reeve |
| 4,572,369 A | 2/1986 | Morris |
| 4,589,549 A | 5/1986 | Hehn |
| 4,609,105 A | 9/1986 | Manes et al. |
| 4,613,044 A | 9/1986 | Saito et al. |
| 4,617,655 A | 10/1986 | Aldenhoven |
| 4,627,534 A | 12/1986 | Komiyama et al. |
| 4,635,797 A | 1/1987 | Bankier |
| 4,643,301 A | 2/1987 | Hehn et al. |
| 4,658,955 A | 4/1987 | Eichner |
| 4,674,303 A | 6/1987 | Salcone, II |
| 4,676,370 A | 6/1987 | Rudick |
| 4,678,080 A | 7/1987 | Nelson |
| 4,685,558 A | 8/1987 | Filiz et al. |
| 4,702,369 A | 10/1987 | Philosophe |
| 4,703,853 A | 11/1987 | Byrns |
| 4,705,166 A | 11/1987 | Ackeret |
| 4,709,813 A | 12/1987 | Wildt |
| 4,717,021 A | 1/1988 | Ditzig |
| 4,718,547 A | 1/1988 | MacTavish |
| 4,722,439 A | 2/1988 | Grobecker et al. |
| 4,724,957 A | 2/1988 | Burgschweiger |
| 4,733,916 A | 3/1988 | Seufert |
| 4,747,484 A | 5/1988 | Ackeret |
| 4,750,618 A | 6/1988 | Schubert |
| 4,753,347 A | 6/1988 | Bellante et al. |
| 4,759,442 A | 7/1988 | Gregerson et al. |
| 4,784,264 A | 11/1988 | Sykes |
| 4,793,479 A | 12/1988 | Otsuka et al. |
| 4,802,601 A | 2/1989 | Pijanowski et al. |
| 4,805,769 A | 2/1989 | Soltis et al. |
| 4,805,770 A | 2/1989 | Grobecker et al. |
| 4,807,749 A | 2/1989 | Ackeret |
| 4,811,000 A | 3/1989 | Humphrey et al. |
| 4,819,797 A | 4/1989 | Holmgren |
| 4,834,238 A | 5/1989 | Hehn et al. |
| 4,838,420 A | 6/1989 | Collett et al. |
| 4,860,897 A | 8/1989 | Fowler et al. |
| 4,871,064 A | 10/1989 | Hehn et al. |
| 4,921,097 A | 5/1990 | Finke et al. |
| 4,928,825 A | 5/1990 | Hehn |
| 4,941,588 A | 7/1990 | Flider |
| 4,947,989 A | 8/1990 | Horton |
| 4,962,854 A | 10/1990 | Ricci |
| 4,966,020 A | 10/1990 | Fotheringham et al. |
| 4,972,690 A | 11/1990 | O'Sullivan |
| 4,974,740 A | 12/1990 | Niles et al. |
| 4,987,639 A | 1/1991 | Baiuley et al. |
| 4,987,999 A | 1/1991 | Hehn |
| 4,988,000 A | 1/1991 | Weisburn et al. |
| 5,007,256 A | 4/1991 | Lowe |
| 5,011,010 A | 4/1991 | Francis et al. |
| 5,016,752 A | 5/1991 | Haugen |
| 5,039,982 A | 8/1991 | Bruhwiler |
| 5,076,460 A | 12/1991 | Hussell |
| 5,081,446 A | 1/1992 | Gill et al. |
| 5,085,322 A | 2/1992 | Lax |
| D324,337 S | 3/1992 | Brady |
| 5,103,978 A | 4/1992 | Secor |
| 5,145,068 A | 9/1992 | Schmitz et al. |
| 5,147,034 A | 9/1992 | Broadhead et al. |
| 5,161,907 A | 11/1992 | Byrne |
| 5,191,983 A | 3/1993 | Hardy |
| 5,193,371 A | 3/1993 | Yamane |
| 5,195,595 A | 3/1993 | Nakagawa |
| 5,205,401 A | 4/1993 | Weisburn et al. |
| 5,205,405 A | 4/1993 | O'Brien et al. |
| 5,209,086 A | 5/1993 | Bruhwiler |
| 5,211,283 A | 5/1993 | Weisburn et al. |
| 5,213,209 A | 5/1993 | Song |
| 5,215,188 A | 6/1993 | Wittman |
| 5,219,417 A | 6/1993 | O'Brien et al. |
| 5,236,081 A | 8/1993 | Fitzsimmons et al. |
| 5,244,085 A | 9/1993 | Lammerant et al. |
| 5,249,677 A | 10/1993 | Lim |
| 5,251,750 A | 10/1993 | Gelardi et al. |
| 5,253,751 A | 10/1993 | Wipper |
| 5,259,498 A | 11/1993 | Weisburn et al. |
| 5,285,918 A | 2/1994 | Weisburn et al. |

| | | | | | | |
|---|---|---|---|---|---|---|
| D347,320 S | 5/1994 | Du Corday | | 5,904,246 A | 5/1999 | Weisburn et al. |
| 5,359,809 A | 11/1994 | Johnson | | 5,906,275 A | 5/1999 | Jokic |
| 5,360,107 A | 11/1994 | Chasin et al. | | D411,071 S | 6/1999 | Cerda-Vicedo |
| 5,366,074 A | 11/1994 | O'Brien et al. | | 5,910,770 A | 6/1999 | Ohara |
| 5,368,162 A | 11/1994 | Holmgren | | 5,918,909 A | 7/1999 | Fiala et al. |
| 5,375,712 A | 12/1994 | Weisburn | | 5,931,291 A | 8/1999 | Sedon et al. |
| 5,377,825 A | 1/1995 | Sykes et al. | | 5,931,294 A | 8/1999 | Weingarden et al. |
| 5,377,827 A | 1/1995 | Roth et al. | | 5,934,114 A | 8/1999 | Weisburn et al. |
| 5,384,103 A | 1/1995 | Miller | | 5,941,382 A | 8/1999 | Fantone et al. |
| 5,390,515 A | 2/1995 | Essick | | 5,944,181 A | 8/1999 | Lau |
| 5,400,902 A | 3/1995 | Kaminski | | 5,944,185 A | 8/1999 | Burdett et al. |
| 5,417,324 A | 5/1995 | Joyce et al. | | 5,950,822 A | 9/1999 | Cloran et al. |
| D358,961 S | 6/1995 | Lax | | 5,960,949 A | 10/1999 | Wynalda, Jr. |
| 5,460,266 A | 10/1995 | Mundorf et al. | | 5,975,298 A | 11/1999 | Sankey et al. |
| 5,462,159 A | 10/1995 | Roth et al. | | 5,984,388 A | 11/1999 | Bacon |
| 5,494,156 A | 2/1996 | Nies | | 5,988,375 A | 11/1999 | Chang |
| 5,499,714 A | 3/1996 | Konno | | 5,988,376 A | 11/1999 | Lax |
| 5,505,299 A | 4/1996 | Ditzig et al. | | 5,996,788 A | 12/1999 | Belden, Jr. et al. |
| 5,515,968 A | 5/1996 | Taniyama | | 5,996,815 A | 12/1999 | Walters et al. |
| 5,524,752 A | 6/1996 | Mazzucchelli | | 6,000,541 A | 12/1999 | Yu |
| 5,526,926 A | 6/1996 | Deja | | 6,016,909 A | 1/2000 | Chang |
| 5,528,914 A | 6/1996 | Nguyen et al. | | D420,240 S | 2/2000 | Sorenson et al. |
| 5,529,182 A | 6/1996 | Anderson et al. | | 6,021,894 A | 2/2000 | Lakoski et al. |
| 5,533,619 A | 7/1996 | Ziegler | | D422,445 S | 4/2000 | Markowitz |
| 5,551,559 A | 9/1996 | Roth et al. | | 6,047,821 A | 4/2000 | Hashimoto et al. |
| 5,551,560 A | 9/1996 | Weisburn et al. | | 6,056,117 A | 5/2000 | Courchesne |
| 5,586,651 A | 12/1996 | Krummenacher | | 6,059,102 A | 5/2000 | Gelardi et al. |
| 5,588,315 A | 12/1996 | Holmgren | | 6,065,593 A | 5/2000 | Howerton et al. |
| 5,593,030 A | 1/1997 | Tell | | 6,065,594 A | 5/2000 | Sankey et al. |
| 5,593,031 A | 1/1997 | Uchida | | D426,978 S | 6/2000 | Belden, Jr. et al. |
| 5,597,068 A | 1/1997 | Weisburn et al. | | 6,085,900 A | 7/2000 | Wong |
| 5,598,728 A | 2/1997 | Lax | | 6,092,650 A | 7/2000 | Budnik |
| 5,601,188 A | 2/1997 | Dressen et al. | | 6,102,200 A | 8/2000 | Dressen et al. |
| 5,609,249 A | 3/1997 | Cheng | | D430,424 S | 9/2000 | Belden, Jr. et al. |
| 5,626,225 A | 5/1997 | Joyce, Jr. | | 6,119,857 A | 9/2000 | Stumpff |
| 5,636,535 A | 6/1997 | Shimada | | 6,123,192 A | 9/2000 | Rufo, Jr. |
| 5,636,737 A | 6/1997 | Marsilio | | 6,125,668 A | 10/2000 | Belden, Jr. |
| 5,653,335 A | 8/1997 | Bauer et al. | | 6,135,280 A | 10/2000 | Burdett |
| 5,660,274 A | 8/1997 | Chien | | 6,164,445 A | 12/2000 | Cooper |
| 5,662,218 A | 9/1997 | Ladwig | | 6,170,656 B1 | 1/2001 | Cerda-Vilaplana et al. |
| 5,680,782 A | 10/1997 | Komatsu et al. | | D437,520 S | 2/2001 | Choi |
| 5,685,425 A | 11/1997 | Choi | | 6,196,384 B1 | 3/2001 | Belden, Jr. |
| 5,685,427 A | 11/1997 | Kuitems et al. | | 6,222,453 B1 | 4/2001 | Joyce |
| 5,690,224 A | 11/1997 | Koizumi | | 6,283,280 B1 | 9/2001 | Wong et al. |
| 5,697,496 A | 12/1997 | Bauer | | 6,354,435 B1 | 3/2002 | Belden, Jr. et al. |
| 5,717,533 A | 2/1998 | Poplawski et al. | | 6,374,648 B1 | 4/2002 | Mitsuyama |
| 5,727,680 A | 3/1998 | Liu | | 6,398,022 B1 | 6/2002 | Mou et al. |
| 5,730,283 A | 3/1998 | Lax | | 6,401,920 B1 | 6/2002 | Gelardi |
| 5,760,689 A | 6/1998 | Holmgren | | 6,412,631 B1 | 7/2002 | Belden, Jr. |
| 5,762,187 A | 6/1998 | Belden, Jr. et al. | | 6,422,387 B1 | 7/2002 | Sedon et al. |
| 5,768,922 A | 6/1998 | Lax | | 6,443,300 B1 | 9/2002 | Gelardi et al. |
| 5,769,217 A | 6/1998 | Derraugh et al. | | 6,474,470 B1 | 11/2002 | Byrne et al. |
| 5,769,218 A | 6/1998 | Yabe | | 6,474,478 B1 | 11/2002 | Huehner et al. |
| 5,772,028 A | 6/1998 | Marsilio et al. | | 6,516,639 B1 | 2/2003 | Margetts et al. |
| 5,775,491 A | 7/1998 | Taniyama | | 6,516,945 B1 | 2/2003 | Myszka et al. |
| 5,775,500 A | 7/1998 | Williams | | 6,523,683 B1 | 2/2003 | Fraser et al. |
| 5,777,884 A | 7/1998 | Belka et al. | | 6,561,347 B1 | 5/2003 | Lax |
| 5,782,348 A | 7/1998 | Burdett | | 6,581,766 B1 | 6/2003 | Hui |
| 5,782,350 A | 7/1998 | Weisburn et al. | | 6,598,742 B1 | 7/2003 | Belden, Jr. et al. |
| 5,788,068 A | 8/1998 | Fraser et al. | | 6,601,414 B1 | 8/2003 | Chang |
| 5,799,784 A | 9/1998 | Bosworth | | 6,601,415 B1 | 8/2003 | Takinami |
| 5,823,341 A | 10/1998 | Nakasuji | | 6,619,079 B1 | 9/2003 | Cheung |
| 5,829,582 A | 11/1998 | Ippolito et al. | | 6,651,811 B1 | 11/2003 | Hai |
| 5,829,584 A | 11/1998 | Raucci, Jr. | | 6,669,018 B1 | 12/2003 | Lau |
| 5,839,576 A | 11/1998 | Kim | | 6,675,961 B1 | 1/2004 | Myszka et al. |
| 5,850,752 A | 12/1998 | Lax | | 6,675,962 B1 | 1/2004 | Myszka et al. |
| 5,887,713 A | 3/1999 | Smith et al. | | 6,675,963 B1 | 1/2004 | Myszka |
| 5,890,590 A | 4/1999 | Doodson | | 6,805,238 B1 * | 10/2004 | Iandoli et al. .............. 206/310 |
| 5,894,924 A * | 4/1999 | Koch ..................... 206/310 | | 6,896,133 B1 * | 5/2005 | Spagna ................... 206/308.2 |
| 5,896,985 A | 4/1999 | Nakasuji | | 2001/0000599 A1 | 5/2001 | Belden, Jr. |
| 5,896,986 A | 4/1999 | Bolognia et al. | | 2001/0035359 A1 | 11/2001 | Sedon et al. |
| 5,899,327 A | 5/1999 | Sykes | | 2002/0000111 A1 | 1/2002 | Belden, Jr. et al. |
| 5,901,840 A | 5/1999 | Nakasuji | | 2002/0003095 A1 | 1/2002 | Jaeb et al. |

| | | | | | | |
|---|---|---|---|---|---|---|
| 2002/0011426 | A1 | 1/2002 | Byrne et al. | JP | 2001-301871 | 10/2001 |
| 2002/0023853 | A1 | 2/2002 | Lax et al. | JP | 2001-354286 | 12/2001 |
| 2002/0046963 | A1 | 4/2002 | Belden, Jr. et al. | JP | 2002-046789 | 2/2002 |
| 2002/0050033 | A1 | 5/2002 | Belden, Jr. et al. | JP | 2002-249190 | 9/2002 |
| 2002/0088851 | A1 | 7/2002 | Hodes | JP | 2003-118789 | 4/2003 |
| 2002/0088855 | A1 | 7/2002 | Hodes | NL | 1 003 965 | 3/1998 |
| 2002/0091573 | A1 | 7/2002 | Hodes | WO | 90/15001 | 12/1990 |
| 2002/0100702 | A1 | 8/2002 | Belden, Jr. et al. | WO | 93/15294 | 8/1993 |
| 2002/0129472 | A1 | 9/2002 | Copen et al. | WO | 99/39068 | 8/1999 |
| 2002/0139701 | A1 | 10/2002 | Luckow | WO | 00/17877 | 3/2000 |
| 2002/0170837 | A1 | 11/2002 | Belden, Jr. et al. | WO | 00/17877 A3 | 3/2000 |
| 2003/0000856 | A1 | 1/2003 | Lax | WO | 00/34954 | 6/2000 |
| 2003/0000860 | A1 | 1/2003 | Byrne | WO | 00/34954 A3 | 6/2000 |
| 2003/0004889 | A1 | 1/2003 | Fiala et al. | WO | 02/42587 | 5/2002 |
| 2003/0019770 | A1 | 1/2003 | Hodes | | | |
| 2003/0029816 | A1 | 2/2003 | Huehner | | | |
| 2003/0034259 | A1 | 2/2003 | Lopez mas | | | |
| 2003/0052023 | A1 | 3/2003 | Gelardi | | | |
| 2003/0080007 | A1 | 5/2003 | Lau | | | |
| 2003/0111367 | A1 | 6/2003 | Lax et al. | | | |
| 2003/0116455 | A1 | 6/2003 | Marsilio et al. | | | |
| 2003/0234190 | A1 | 12/2003 | Kuo | | | |
| 2004/0031708 | A1 | 2/2004 | Spagna | | | |
| 2004/0040349 | A1 | 3/2004 | Guttadauro et al. | | | |
| 2004/0060834 | A1 | 4/2004 | Farrar et al. | | | |
| 2004/0173477 | A1 | 9/2004 | Lax et al. | | | |

FOREIGN PATENT DOCUMENTS

| | | |
|---|---|---|
| CN | 1143593 | 2/1997 |
| CN | 2298586 | 11/1998 |
| CN | 1215885 | 5/1999 |
| DE | 3316802 | 11/1984 |
| DE | 3923107 | 1/1991 |
| DE | 297 22 209 | 4/1998 |
| EP | 0211088 | 2/1987 |
| EP | 0308810 | 3/1989 |
| EP | 0312172 | 4/1989 |
| EP | 0 545 494 | 6/1993 |
| EP | 0616103 | 9/1994 |
| EP | 0729897 | 9/1996 |
| EP | 1 264 953 | 12/2002 |
| FR | 2543421 | 10/1984 |
| FR | 2608564 | 6/1988 |
| FR | 2628250 | 9/1989 |
| FR | 2628717 | 9/1989 |
| FR | 2711311 | 4/1995 |
| FR | 2715817 | 8/1995 |
| GB | 2036697 | 7/1980 |
| GB | 2079726 | 1/1982 |
| GB | 2129779 | 5/1984 |
| GB | 2351277 | 12/2000 |
| GB | 2369348 | 5/2002 |
| GB | 2371039 | 7/2002 |
| JP | 62-241187 | 10/1987 |
| JP | 07-291336 | 11/1995 |
| JP | 9-132287 | 5/1997 |
| JP | 10-116394 | 5/1998 |
| JP | 10-194371 | 7/1998 |
| JP | 11-035084 | 2/1999 |
| JP | 11-147584 | 6/1999 |
| JP | 11-301766 | 11/1999 |
| JP | 2000-191076 | 7/2000 |
| JP | 2000-191078 | 7/2000 |
| JP | 2000-219288 | 8/2000 |
| JP | 2000-237008 | 9/2000 |
| JP | 2001-002101 | 1/2001 |
| JP | 2001-019077 | 1/2001 |
| JP | 2001-082013 | 3/2001 |
| JP | 2001-163391 | 6/2001 |
| JP | 2001-171776 | 6/2001 |
| JP | 2001-213492 | 8/2001 |
| JP | 2001-253487 | 9/2001 |

OTHER PUBLICATIONS

Derwent Information Ltd. Abstract of German Patent No. DE 29620435, Feb. 6, 1997.
Derwent Information Ltd. Abstract of U.S. Appl. No. 5,996,788, Dec. 7, 1999.
"Security Products for Entertainment Media: Program 2000," Clear-Vu Products, Westbury, New York, Mar. 2000.
Derwent Information Ltd. Abstract of U.S. Appl. No. 6,065,594, May 23, 2000.
Derwent Information Ltd. Abstract of U.S. Appl. No. 6,135,280, Oct. 24, 2000.
"Security Products for Entertainment Media: Program 2001," Clear-Vu Products, Westbury, New York, Mar. 2001.
Derwent Information Ltd. Abstract of U.S. Appl. No. 6,222,453, Apr. 24, 2001.
Derwent Information Ltd. Abstract of U.S. Appl. No. 2001/0000599, May 3, 2001.
"Zenith Pac Technology: The Intelligent Standard," presented in Melbourne, Australia by Clear-Vu Products, Westbury, New York, Nov. 13, 2001.
Derwent Information Ltd. Abstract of PCT Publication No. WO 200207152, Jan. 24, 2002.
Derwent Information Ltd. Abstract of PCT Publication No. WO 200207165, Jan. 24, 2002.
Derwent Information Ltd. Abstract of U.S. Appl. No. 6,354,435, Mar. 12, 2002.
Clear-Vu Products, Press Release, Zenith Pac Brochure, Mar. 29, 2002.
"Zenith Pac," presented at ERSC Conference in New York by Clear-Vu Products, Westbury, New York, Apr. 4, 2002.
Derwent Information Ltd. Abstract of PCT Publication No. WO 200229816, Apr. 11, 2002.
Clear-Vu Products, Press Release, Zenith Software Pac, Jun. 28, 2002.
Derwent Information Ltd. Abstract of U.S. Appl. No. 2002/0096442, Jul. 25, 2002.
Derwent Information Ltd. Abstract of PCT Publication No. WO 200266342, Aug. 29, 2002.
Clear-Vu Products, Press Release, Zenith Flex Pac Brochure, Oct. 8, 2002.
Red Tag™ Brochure—AGI Media Packaging, Introducing the Red Tag™ Security System—World Class Retail Security for DVD and CD-ROM, Oct. 9, 2002.
Derwent Information Ltd. Abstract of German Patent No. DE 20211245, Nov. 7, 2002.
Derwent Information Ltd. Abstract of U.S. Appl. No. 6,540,074, Apr. 1, 2003.
Clear-Vu Products, Press Release, VIVA/Clear-Vu Reach Milestone in Media Packaging, Apr. 7, 2003.
Clear-Vu Products, Press Release, ZII Locking System Sell Sheet, Apr. 24, 2003.
Clear-Vu Products, Press Release, One Time Internal Locking System, Apr. 29, 2003.
Derwent Information Ltd. Abstract of PCT Publication No. WO 200347997, Jun. 12, 2003.
Clear-Vu Products, Press Release, Merging Physical and Electronical Security into Retail Packaging, Jun. 12, 2003.

Derwent Information Ltd. Abstract of PCT Publication No. WO 200349083, Jun. 12, 2003.

Derwent Information Ltd. Abstract of U.S. Appl. No. 2003/0111365, Jun. 19, 2003.

Clear-Vu Products, Press Release, Making A Retail for Pilfer-proof Packaging, Jun. 24, 2003.

Peregrine Marketing, LLC presentation, PM @ POS, Piracy Management at Point of Sale, Jul. 10, 2003.

Clear-Vu Products for Entertainment Media, Press Release, 2003 Product Catalog, Jul. 15, 2003.

Clear-Vu Products, EAS Tag Press Release, OTC Safe Sell Packaging Solutions, Jul. 15, 2003.

Clear-Vu Products, Press Release, Clear Vu Quick Path, Jul. 17, 2003.

Clear-Vu Products, Press Release, The Zenith OneTime Internal Security Locking System, Aug. 2003.

Public Relations@nexpak.com, Nexpak's New Lockable Rental Case Provides greater security for Live DVD's and Games; Sep. 22, 2003.

http://www.nexpak.com, Nexpak's New Lockable Rental Case Provides greater security for Live DVD's and Games (visited and printed on Oct. 22, 2003).

http://www.tagcompany.com/redtag/sitemap.htm, The Red Tag—Advanced DVD & Games Security System (visited and printed on Oct. 22, 2003).

* cited by examiner

DENIAL SYSTEM FOR SECURING AN ASSET WITHIN A CONTAINER AND METHODS OF USE

This application claims the benefit of U.S. provisional patent application Nos. 60/458,033, filed Mar. 26, 2003 and 60/512,916, filed Oct. 20, 2003, both of which are hereby incorporated by reference herein in their entireties.

BACKGROUND OF THE INVENTION

The present invention relates to benefit denial systems and methods of use and, more particularly, to benefit denial systems for securing an asset within a container and methods of use.

In order to make a shopping experience more enjoyable, assets may be displayed for sale or rental in a manner in which they are they are available to a potential customer to handle and examine. For example, potential customers may handle the asset to determine whether to buy or rent the item. Providing a customer with an opportunity to handle an asset before purchasing it is often referred to as a "live sale."

One environment in which a live sale is particularly desirable is in connection with the sale or rental of storage media, such as, for example, digital versatile discs ("DVDs"), compact discs ("CDs"), and video games. Storage media is typically displayed in a storage container that includes a cover portion and a base portion that is hingedly coupled to the cover portion. The storage media to be secured is placed in the container, and the cover portion is mated with the base portion to secure the asset within the container. Since many potential customers may handle these storage containers, however, it is necessary to provide a locking mechanism to deter potential thieves from stealing the storage medium.

Current locking mechanisms include, for example, locking mechanisms that interact with a container such that a potential thief is prevented from opening the container and removing the asset stored therein. Examples of such locking mechanisms are described, for example, in Lax et al. U.S. patent publication No. US 2002/0023853, published Feb. 28, 2002 and Lax U.S. Pat. No. 6,561,347, both of which are hereby incorporated by reference herein in their entireties. Even with these mechanisms, however, a thief may still run out of a retail or rental establishment with the locking mechanism still attached to the container, and may find it worthwhile to expend the substantial effort required to break open the locked container.

Accordingly, it would be desirable to provide benefit denial systems for securing an asset within a container and methods of use.

SUMMARY OF THE INVENTION

In accordance with the present invention, benefit denial systems for securing an asset within a container and methods of use are provided. Such assets may include, for example, any item of value that a retail or rental establishment desires to deny the benefit of to a potential thief. One example of such an asset is a storage medium, including a DVD, CD, video game, memory card, or any other suitable storage medium.

In some embodiments of the present invention, a device for securing an asset within a container may be provided. The device may include a base member having a first portion configured to be coupled to the container and a second portion that extends from the first portion. The device may include a locking member that is configured to engage the second portion of the base member such that the asset is secured between the base member and the locking member. A portion of the locking member is configured to be acted upon by an applied force such that the locking member disengages the base member.

In some embodiments of the present invention, a method for securing an asset within a container may be provided. A device for securing the asset may be provided. The device may include a base member having a first portion and a second portion that extends from the first portion. The device may include a locking member. A portion of the locking member may be configured to be acted upon by an applied force such that the locking member disengages the base member. The first portion of the base member may be coupled to the container. The asset may be placed in engagement with the base member. The second portion of the base member may be engaged with the locking member such that the asset is secured between the base member and the locking member.

In some embodiments of the present invention, a method for removing an asset from within a container may be provided. A device for securing the asset may be provided. The device may include a base member having a first portion that is coupled to the container and a second portion that extends from the first portion. The device may include a locking member that is in engagement with the second portion of the base member such that the asset is secured between the base member and the locking member. A portion of the locking member may be acted upon with an applied force such that the locking member disengages the base member.

Further features of the invention, its nature and various advantages will be more apparent from the accompanying drawings and the following detailed description.

DETAILED DESCRIPTION OF THE INVENTION

In accordance with the present invention, benefit denial systems for securing an asset within a container and methods of use are provided. Such benefit denial systems of the present invention may include a benefit denial device that secures the asset within the container. The benefit denial device may include a base member and at least one locking member, and the asset may be secured therebetween. By securing the asset between the base member and a locking member, the asset will be rendered unusable if a thief attempts to remove the asset from the container. For example, if the asset is a storage medium such as a DVD, then the DVD will break if the thief attempts to remove the DVD from the confines of the benefit denial device.

For a legitimate customer, the asset may be removed from between the base member and locking member at the retail or rental establishment. For example, using a key arrangement, which may also be referred to herein as a decoupling device, the benefit denial device may be acted upon by the key arrangement such that the asset can be removed from the container.

In embodiments of the present invention involving storage media, a benefit denial device is provided that may be used with existing storage containers. In other words, the benefit denial device may be coupled to the container in conjunction with the hub structure that exists in the container. For example, the benefit denial device may snap into place over top of the hub structure, such that the hub structure is still used to receive an opening in a storage medium such as a DVD. In such embodiments using a snap fit, the benefit denial device may be fully separable from the container.

Illustrative embodiments of the present invention are shown in FIGS. 1–34, which are described in detail hereinbelow.

Figure 1:
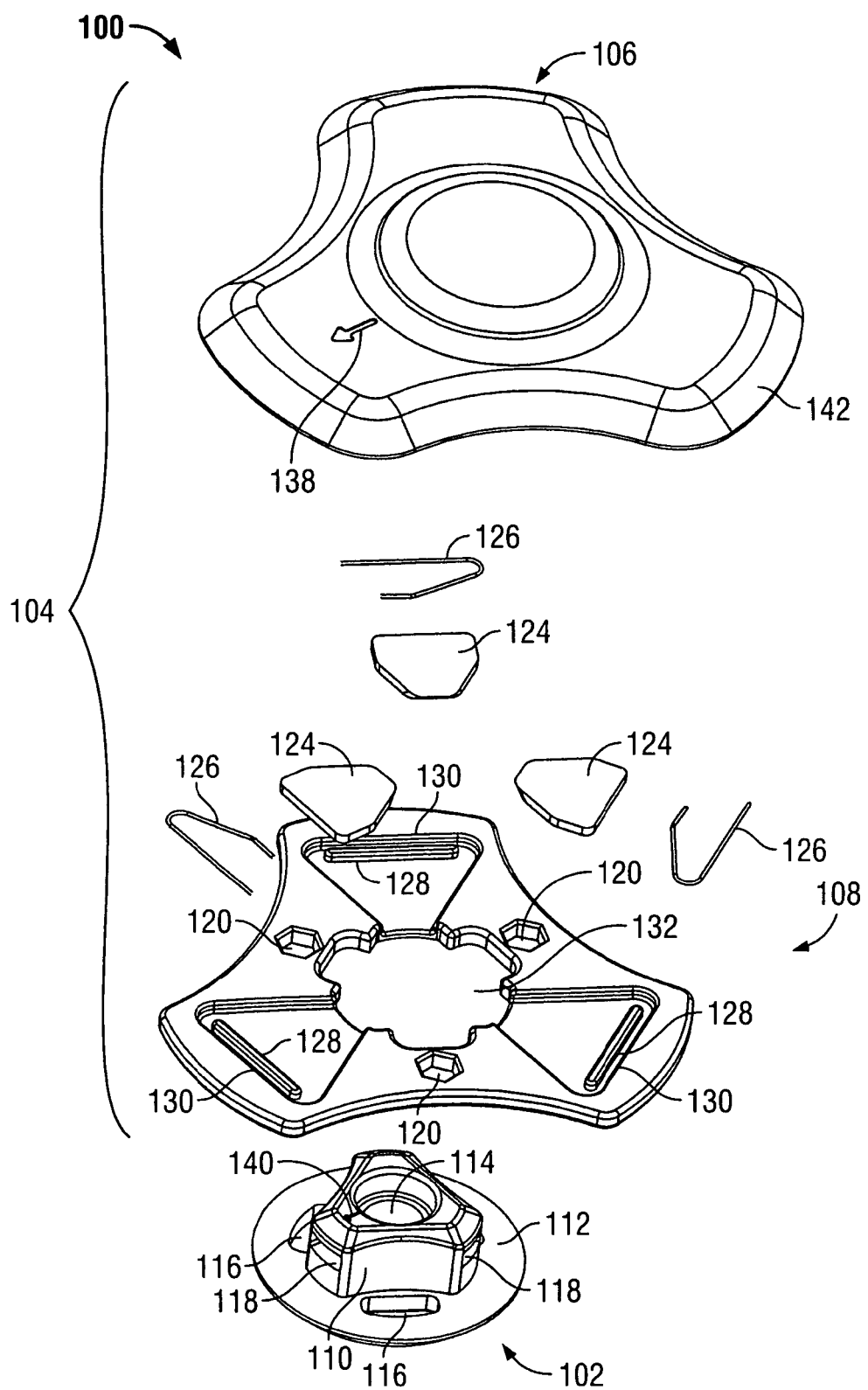
FIG. 1 is an exploded perspective view of an illustrative benefit denial device in accordance with the present invention.

FIG. 1 shows an exploded perspective view of an illustrative benefit denial device 100 in accordance with the present invention. Benefit denial device 100, which for simplicity will be referred to herein simply as device 100, may include a base member 102 and a locking member 104. Locking member 102 may further include a cover 106 and a retainer plate 108.

Base member 102 may include a lock receiving portion 110 and a disc portion 112. In some embodiments of the present invention, base member 102 may be coupled to a container for storage media. For such coupling, base member 102 may include an one or both of an opening 114 for receiving a snapping mechanism of the storage container, and a plurality of openings 116 that extend through disc portion 112 and receive portions of the hub of the container (see, for example, FIGS. 4 and 5, which will be described in detail hereinbelow).

Base member 102 may include a plurality of receptacles 118 for receiving corresponding latches 124 of locking member 104 when the locking member is mated with the base member. In such a configuration, an asset may be secured between base member 102 and locking member 104. Preferably, receptacles 118 do not extend through the entirety of lock receiving portion 110 of base member 102, which prevents access to latches 124 when the latches are received by the receptacles. (The interaction between base member 102 and locking member 104 to secure an asset therebetween will be described in more detail hereinbelow).

Base member 102 may be constructed with a flat, solid base (with the exception of openings 114 and 116) to prevent access to the area confined within the walls of lock receiving portion 110. In particular, this prevents access to latches 124 of locking member 104 when the latches are received within receptacles 118.

To secure an asset, base member 102 may interact with locking member 104 of device 100. As shown in FIG. 1, locking member 104 includes a cover 106 and a retainer plate 108. Cover 106 may be coupled to retainer plate 108 to form locking member 104.

Figure 2:
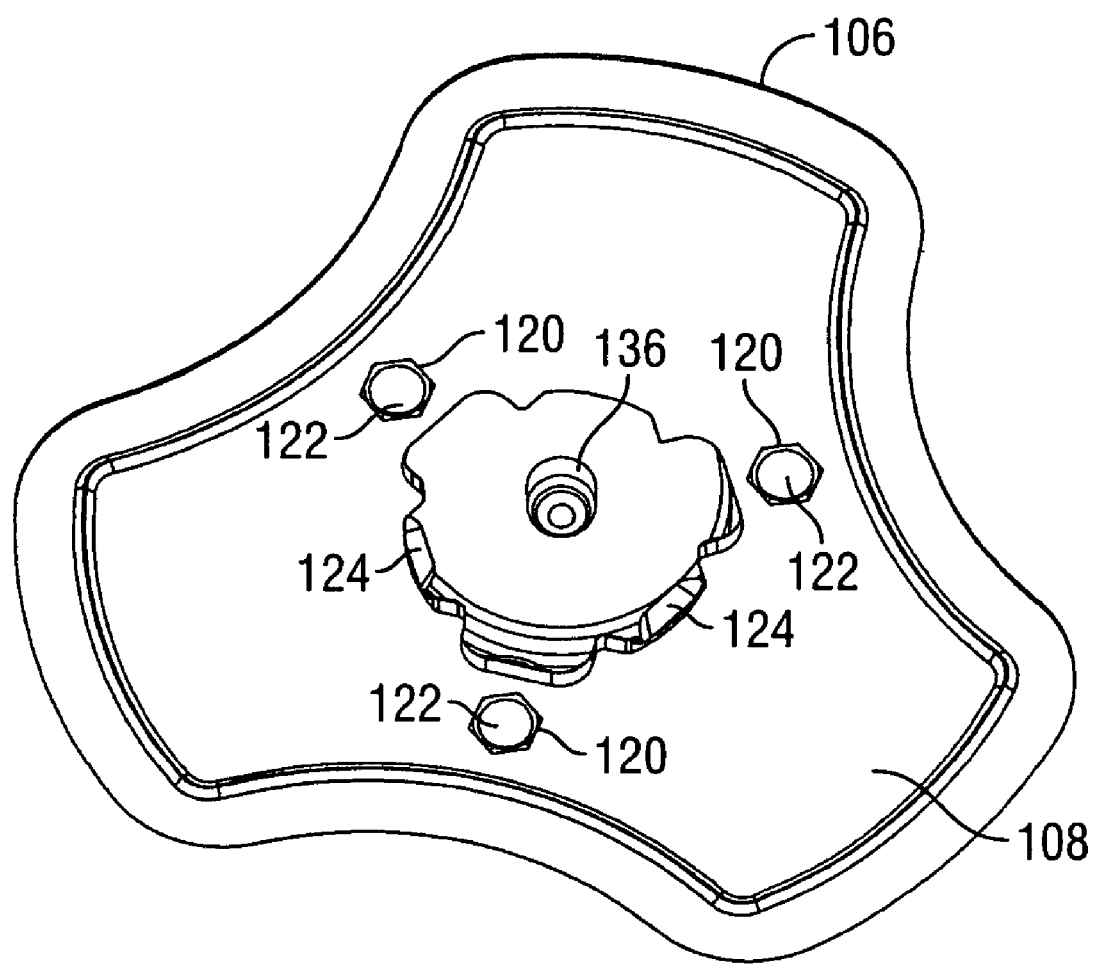
FIG. 2 is a perspective view of a portion of the benefit denial device of FIG. 1 in accordance with the present invention.

As shown in FIG. 1, retainer plate 108 may include a plurality of sockets 120 to receive corresponding pins (not shown) of cover 106 in a press fit relationship, thereby coupling the cover and retainer plate together. A perspective view of the assembly of cover 106 and retainer plate 108, demonstrating this relationship, is shown in FIG. 2. As shown in FIG. 2, pins 122 of cover 106 may be received within sockets 120 of retainer plate 108 in a press fit relationship. Sockets 120 and pins 122 may have any suitable cross-sections, such as, for example, circular, oval, square, rectangular, hexagonal, or any other suitable cross section.

Although FIG. 2 demonstrates a press fit relationship as the coupling means between cover 106 and retainer plate 108, it should be noted that cover 106 and retainer plate 108 may be coupled together in any suitable manner.

Referring back to FIG. 1, locking member 104 may interact with base member 102 to secure an asset therebetween. Locking member 104, and in particular retainer plate 108, may include a plurality of latches 124. Latches 124 may be coupled to retainer plate 108 with springs 126. The end of springs 126 that interacts with retainer plate 108 may be received between rib 128 and wall 130 of retainer plate 130. The other end of spring 126 may be affixed to a latch 124 in any suitable manner, such as by using an adhesive, a weld, or any other suitable means for attachment. (The configuration of latches 124 with respect to retainer plate 130 is shown, for example, in FIG. 3.) Springs 126 may be, for example, wire-formed springs that maintain the positioning of latches 124 (e.g., within receptacles 118 of base member 102). However, the example shown in FIG. 1 is merely illustrative, and springs 126 may be any other suitable type of spring.

Figure 3:
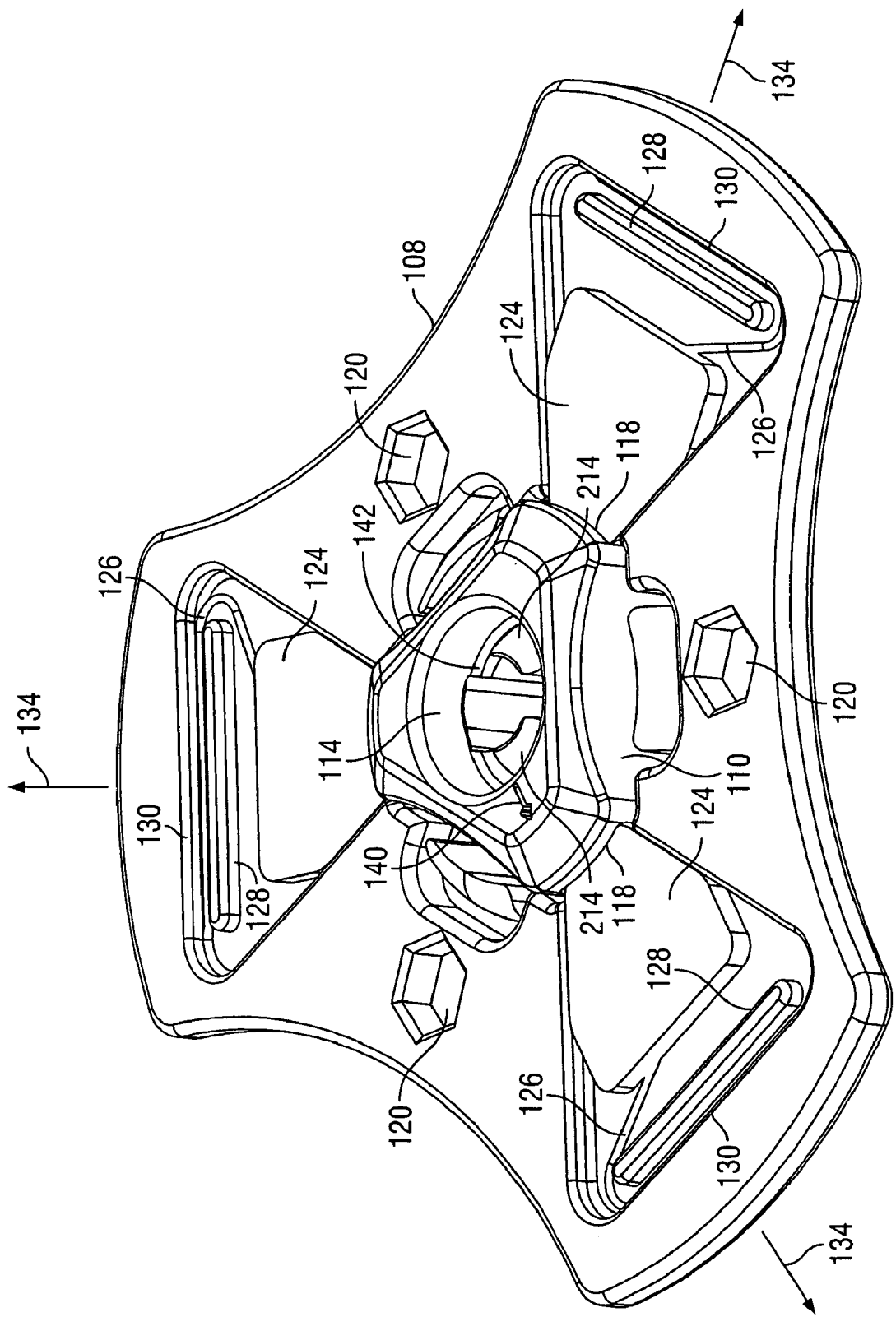
FIG. 3 is a perspective view of another portion of the benefit denial device of FIG. 1 in accordance with the present invention.

Latches 124 may be configured such that, when locking member 104 is mated with base member 102, latches 124 are received within corresponding receptacles 118. This interaction of locking member 104 and base member 102 is shown, for example, in FIG. 3 (for simplicity, cover 106 is not shown in FIG. 3). As shown in FIG. 3, when latches 124 are received within corresponding receptacles 118, base member 102 and locking member 104 are in a locked position. To remove locking member 104 from base member 102, a key arrangement may be provided that acts upon latches 124 such that the latches are no longer received within receptacles 118. For example, the key arrangement may provide a force that compels each latch 124 to move in the direction shown by respective arrow 134 such that the latch is no longer received within respective receptacle 118. Preferably, the key arrangement provides a magnetic field using a combination of magnets, and latches 124 are constructed of a materials that reacts in the presence of a magnetic field.

As shown in the FIGS., locking member 104 includes three latches 124. However, this is merely illustrative, and locking member 104 may include any desired number of latches. In particular, the greater the number of latches, the more difficult it will be for a thief to use a make-shift key arrangement to remove locking member 104 from base member 102.

In some embodiments, latches 124 may be constructed such that the latches vary as to one or both of positioning with respect to retainer plate 108 and size. Such variation amongst latches 124 requires a key arrangement that is specific to the particular size and orientation of latches in the locking member, thereby making it more difficult for a thief to use a make-shift key arrangement to remove locking member 104 from base member 102. In one example, one or all of latches 124 may be a different size than the other latches 124. As a result, the portion of each latch 124 acted upon by a magnetic field of a key arrangement may vary in location radially out from the center of retainer plate 108. In another example, one or all of latches 124 may be oriented in different locations with respect to retainer plate 108. The variance in orientation also results in varying locations radially out from the center of retainer plate 108 on which a magnetic field of a key arrangement may act.

Cover 106 and base member 102 may include arrows 138 and 140, respectively, to assist in aligning locking member 104 properly with respect to the base member. For example, by aligning both of arrows 138 and 140 with one another prior to mating locking member 104 with base member 102, latches 124 will be properly aligned with their respective receptacles 118 when the base and locking members are mated. In some embodiments, lock receiving portion 110 of base member 102 may not fit through opening 132 of retainer plate 108 unless arrows 138 and 140 are aligned properly. Arrows 138 and 140 may be placed onto cover 106 and base member 102, respectively, by any suitable means such as, for example, gluing, stamping, molding, heat treating, cutting, or any other suitable means.

Cover 106 may include a chamfered edge 142 around the periphery of the cover. The chamfering of edge 142 makes it difficult to grab onto locking member 104 and forcefully remove it from its interaction with base member 102.

As shown in FIG. 1, cover 106 is substantially Y-shaped. However, the shape of cover 106 shown in FIG. 1 is merely illustrative, and cover 106 may be constructed in any suitable shape, such as, for example, circular, rectangular, or any other suitable shape. Preferably, retainer plate 108 is of substantially the same shape as cover 106.

When locking member 104 is mated with base member 102, lock receiving portion 110 of base member 102 may extend through opening 132 of retainer plate 108. In embodiments of the present invention in which device 100 is used in a container for storage media, and as described hereinabove, base member 102 may be snapped into place within the container such that a snapping mechanism of the container is received within opening 114 of the base member 102. Cover 106 may include a protrusion 136 (FIG. 2) that interacts with the snapping mechanism of the container when locking member 104 is mated with base member 102. Protrusion 136 (FIG. 2) may prevent the snapping mechanism from flexing inward when locking member 104 is mated with base member 102, which in turn prevents device 100 from being removed from the container.

Base member 102, cover 106, and retainer plate 108 may be constructed of any suitable materials that have a suitable strength and stiffness to resist tampering with device 100. Such materials may include, for example, a polyurethane resin (e.g., Isoplast® as manufactured by Dow Chemical Company), aluminum, aluminum alloy, stainless steel, or any other suitable material. Each of base member 102, cover 106, and retainer plate 108 (with the exclusion of latches 124) may be constructed of materials that do not react in the presence of a magnetic field.

Figure 4:
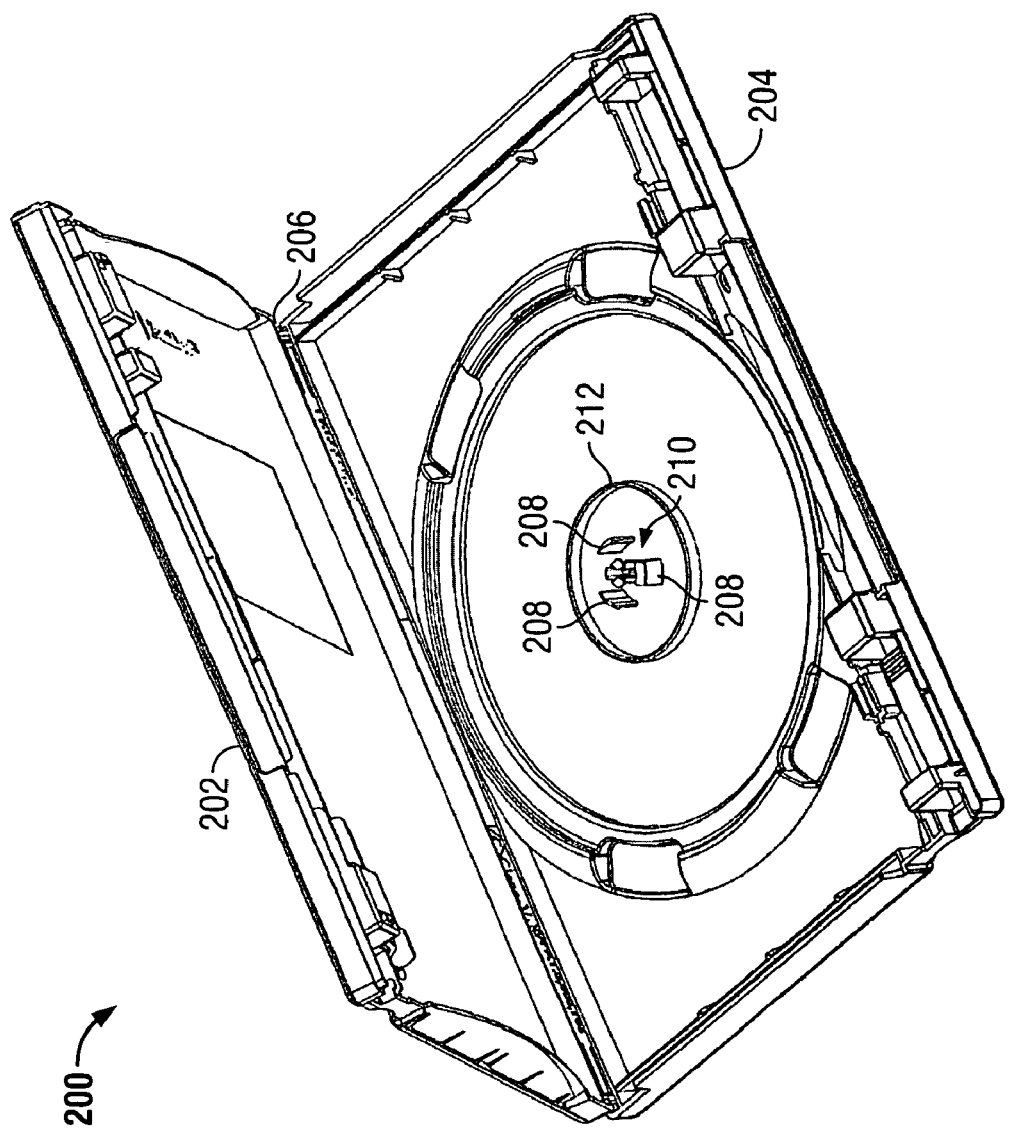
FIG. 4 is a perspective view of an illustrative container for storage media that may be used with the benefit denial device of FIG. 1 in accordance with the present invention.

FIG. 4 shows a perspective view of an illustrative container 200 for storage media that may be used with benefit denial device 100 (FIG. 1) in accordance with the present invention. Container 200 includes a first cover 202, a second cover 204, and a spine 206 disposed therebetween. First cover 202 and second cover 204 are pivotally coupled to spine 206 to form a living hinge. Container 200 may be similar to, and may include any of the features of, an illustrative container for storage media described in Lax et al. U.S. patent publication No. US 2002/0023853, published Feb. 28, 2002, which is incorporated by reference hereinabove.

Container 200 may be sized similarly to, for example, a standard library case. In such an example, container 200 may work with current manufacturing automation, and may possess similar wall heights, disc position, and booklet size as a standard library case.

Container 200 may include a hub that includes a plurality of hub members 208. An opening of a disc may be placed on hub members 208 such that the disc is retained within container 200 (see, for example, FIG. 6). As shown in FIG. 4, container 200 includes three hub members 208. However, this is merely illustrative, and container 200 may include any suitable number of hub members 208 for retaining a disc thereon. A seating area 212 may be included around hub members 208 such that when a disc is placed on the hub members, the bottom side of the disc that faces second cover 204 is protected from damage (e.g., scratching).

Container 200 may include a snapping mechanism 210, which may be referred to herein simply as snap 210. Snap 210 facilitates engagement with base member 102 of device 100 (FIG. 1). In particular, snap 210 engages base member 102 such that the base member is retained within container 200.

Figure 5:
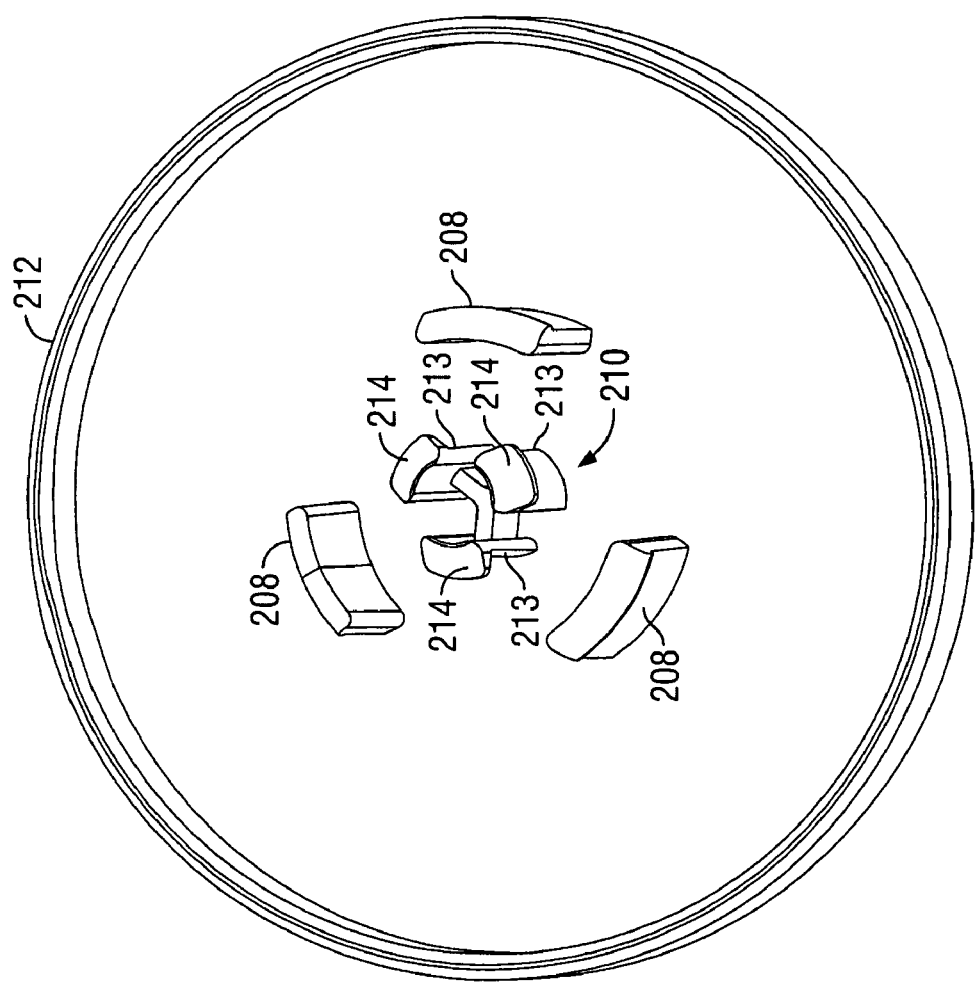
FIG. 5 is an enlarged perspective view of a hub portion of the container of FIG. 4 in accordance with the present invention.

An enlarged perspective view of hub members 208 and snap 210 is shown in FIG. 5. Hub members 208 may be received within openings 116 of base member 102. Snap 210 may be received within opening 114 of base member 102. In particular, snap 210 may include a plurality of snapping members 213 having respective flange portions 214. When base member 102 is placed in engagement with snap 210, snapping members 213 may flex inward toward one another until flange portions 214 reach indentation 142 of the base member. At that point, flange portions 214 may be received within indentation 142, thereby causing snapping members 213 to resume their initial, unstrained positioning. The engagement of base member 102 and snap 210, and in particular the engagement of indentation 142 and flange portions 214, secures base member 102 to container 200.

Figure 6:
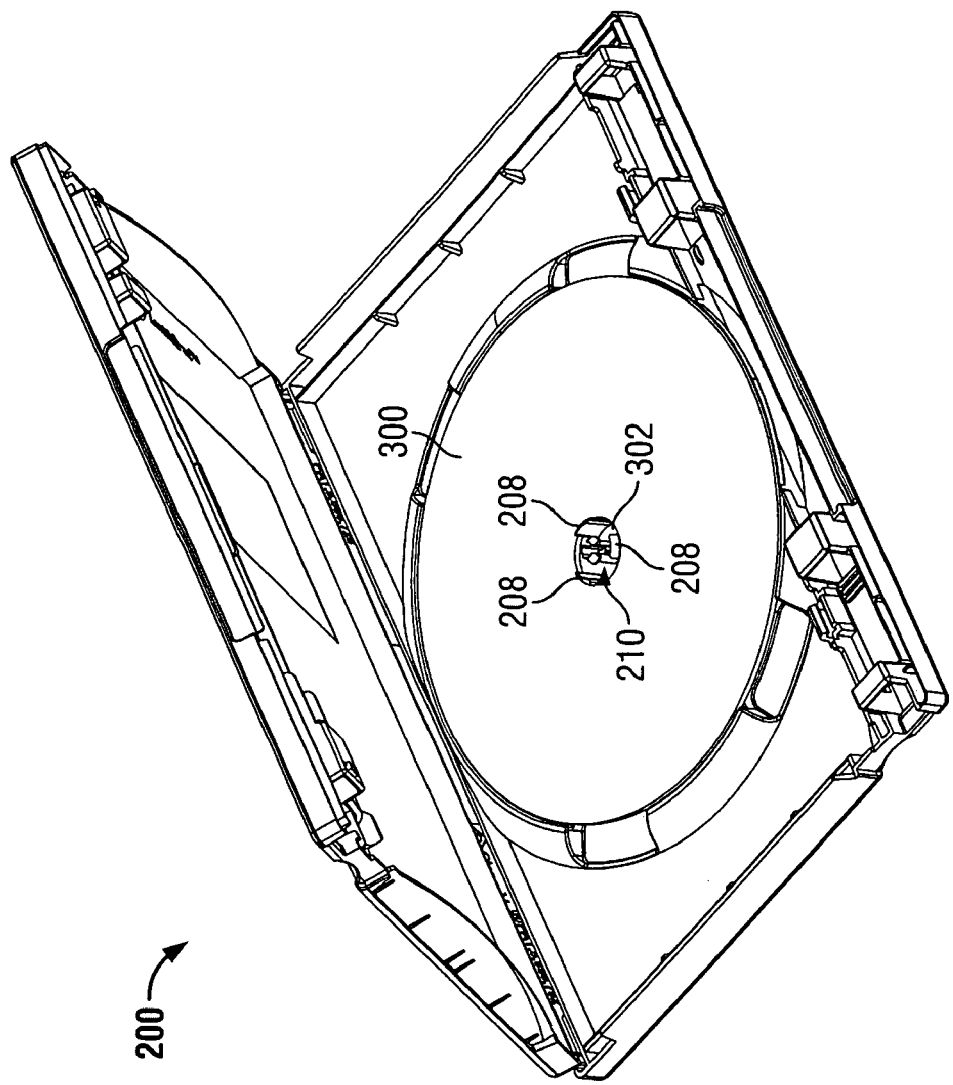
FIG. 6 is a perspective view of the container of FIG. 4 and an illustrative storage medium in accordance with the present invention.

It should be noted that container 200, and in particular hub members 208, are suitable for receiving a storage medium thereon when base member 102 is not coupled to the container. As shown in FIG. 6, for example, opening 302 of disc 300 is in engagement with hub members 208 such that the disc is secured within container 200.

Figure 7:
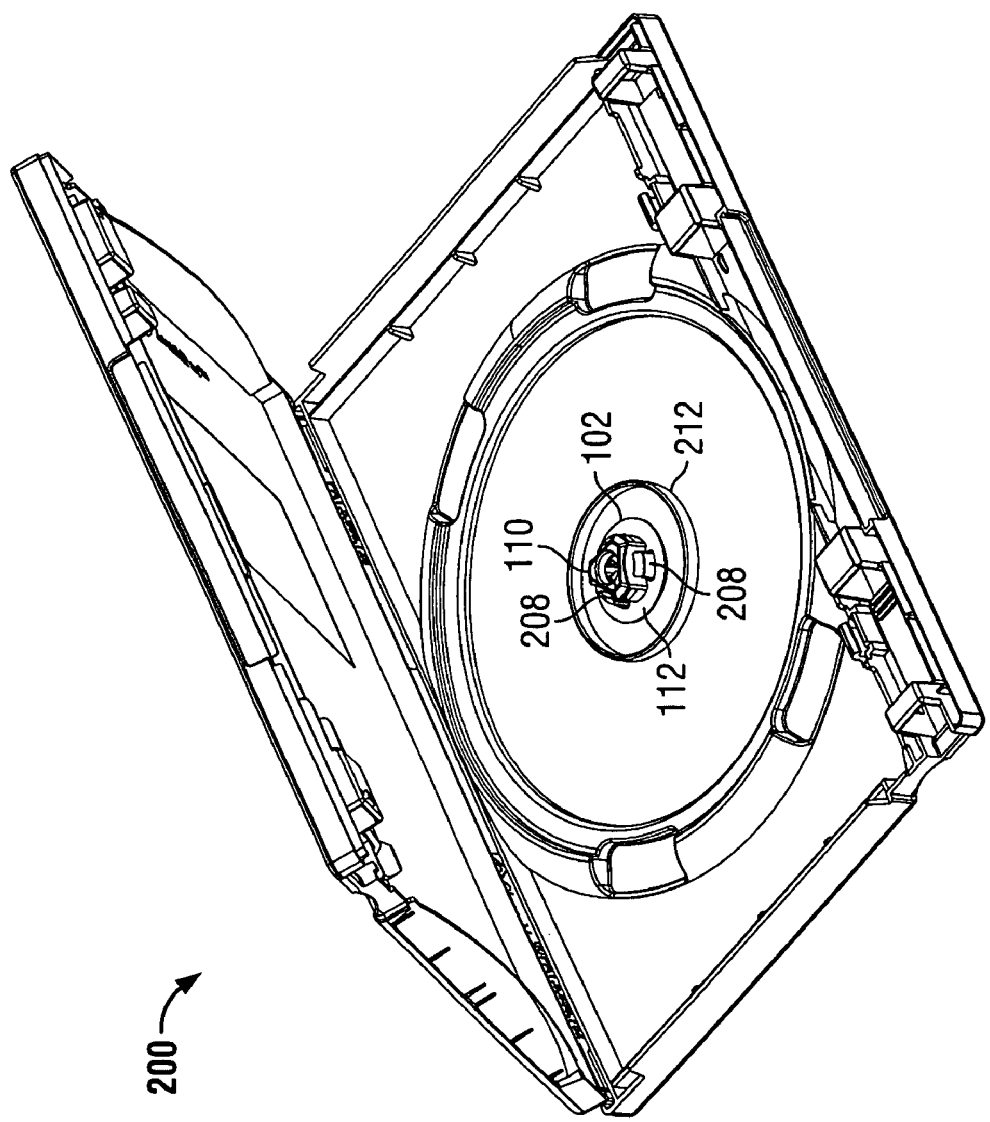
FIG. 7 is a perspective view of the container of FIG. 4 and a base member of the benefit denial device of FIG. 1 in accordance with the present invention.

FIG. 7 shows a perspective view of container 200 in engagement with base member 102 of device 100 (FIG. 1) in accordance with the present invention. Base member 102 may be snapped into container 200 such that snap 210 engages indentation 142 in opening 114 (FIG. 3). Hub members 208 may be received in openings 116 of base member 102. Disc portion 112 of base member 102 may be seated within seating area 212 of container 200. Lock receiving member 110 of base member 102 may extend up from disc portion 112 within the confines of hub members 208.

Figure 8:
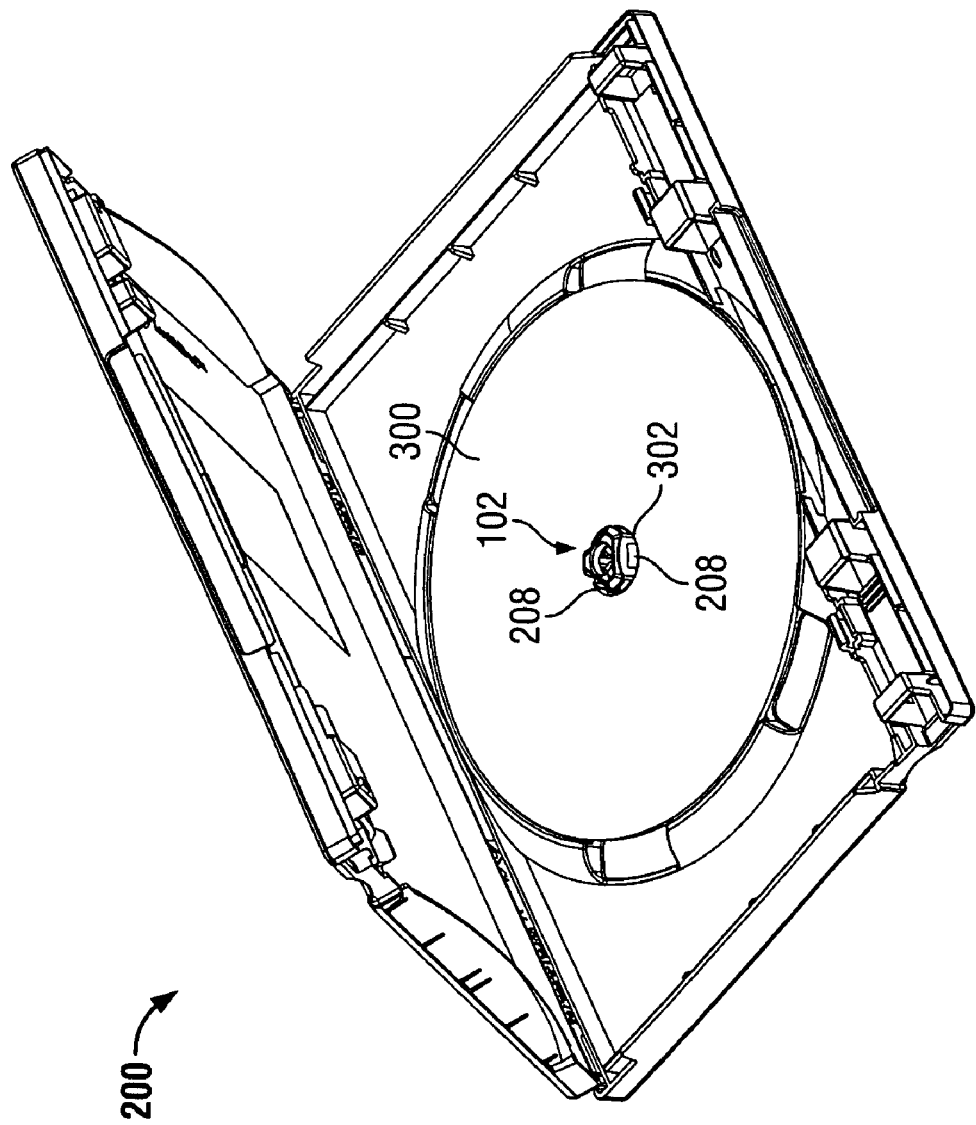
FIG. 8 is a perspective view of the assembly of FIG. 7 and an illustrative storage medium in accordance with the present invention.

As shown in FIG. 8, once base member 102 is in engagement with container 200, an opening of a disc 300 may be placed around hub members 208 such that the disc is retained within the container. An enlarged perspective view demonstrating the engagement of disc 300 and hub members 208 is shown in FIG. 9.

Figure 9:
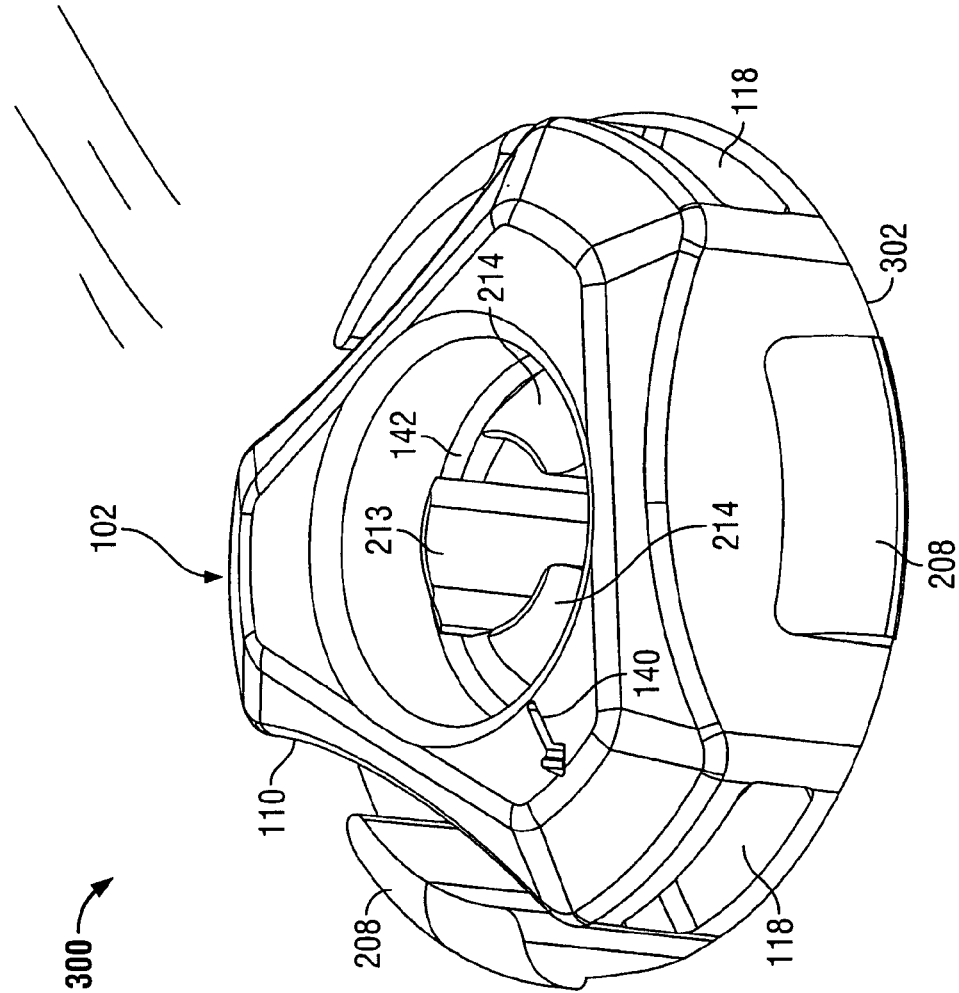
FIG. 9 is an enlarged perspective view of a portion of the assembly of FIG. 8 in accordance with the present invention.

FIG. 9 shows that lock receiving portion 110 of base member 102 extends through opening 302 of disc 300 such that receptacles 118 are situated proximal to the top surface of the disc.

Figure 10:
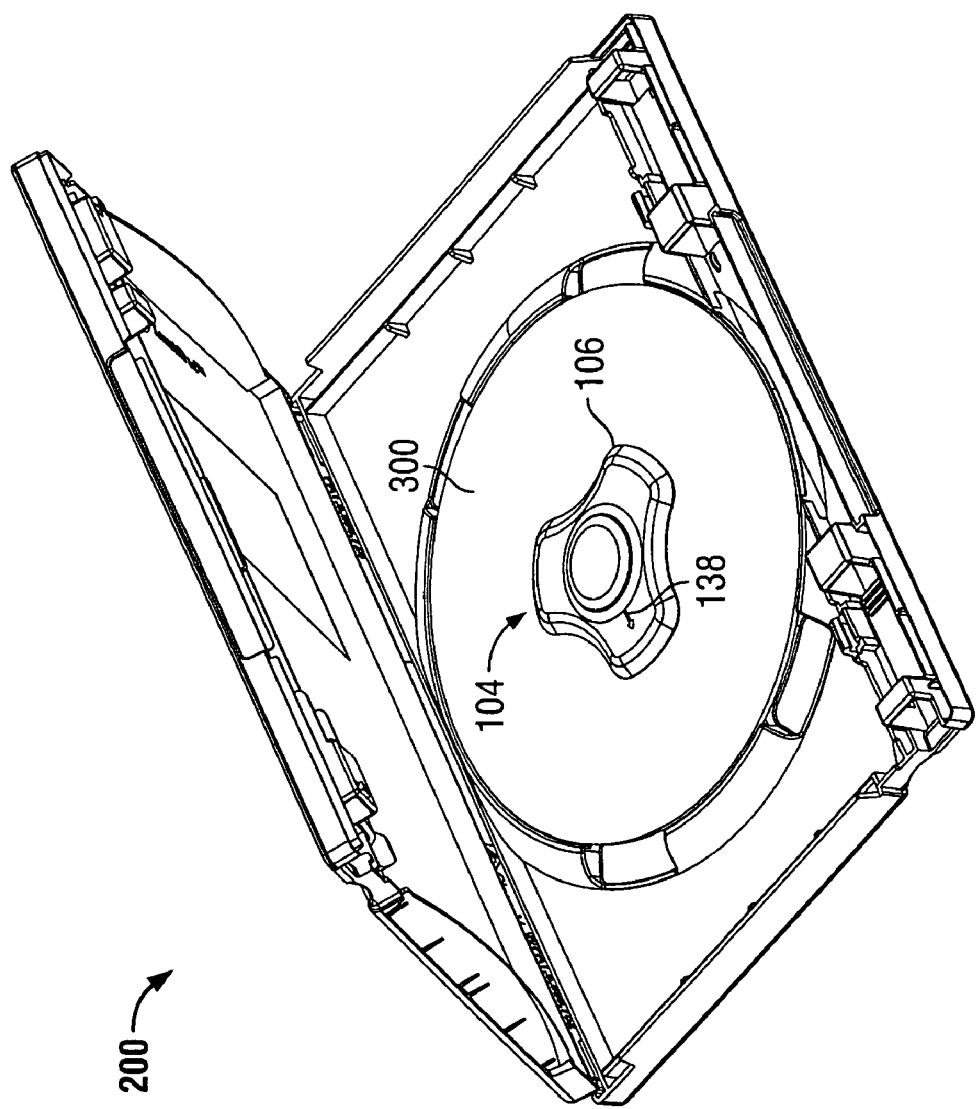
FIG. 10 is a perspective view of the assembly of FIG. 8 and a locking member of the benefit denial device of FIG. 1 in accordance with the present invention.
Figure 11:
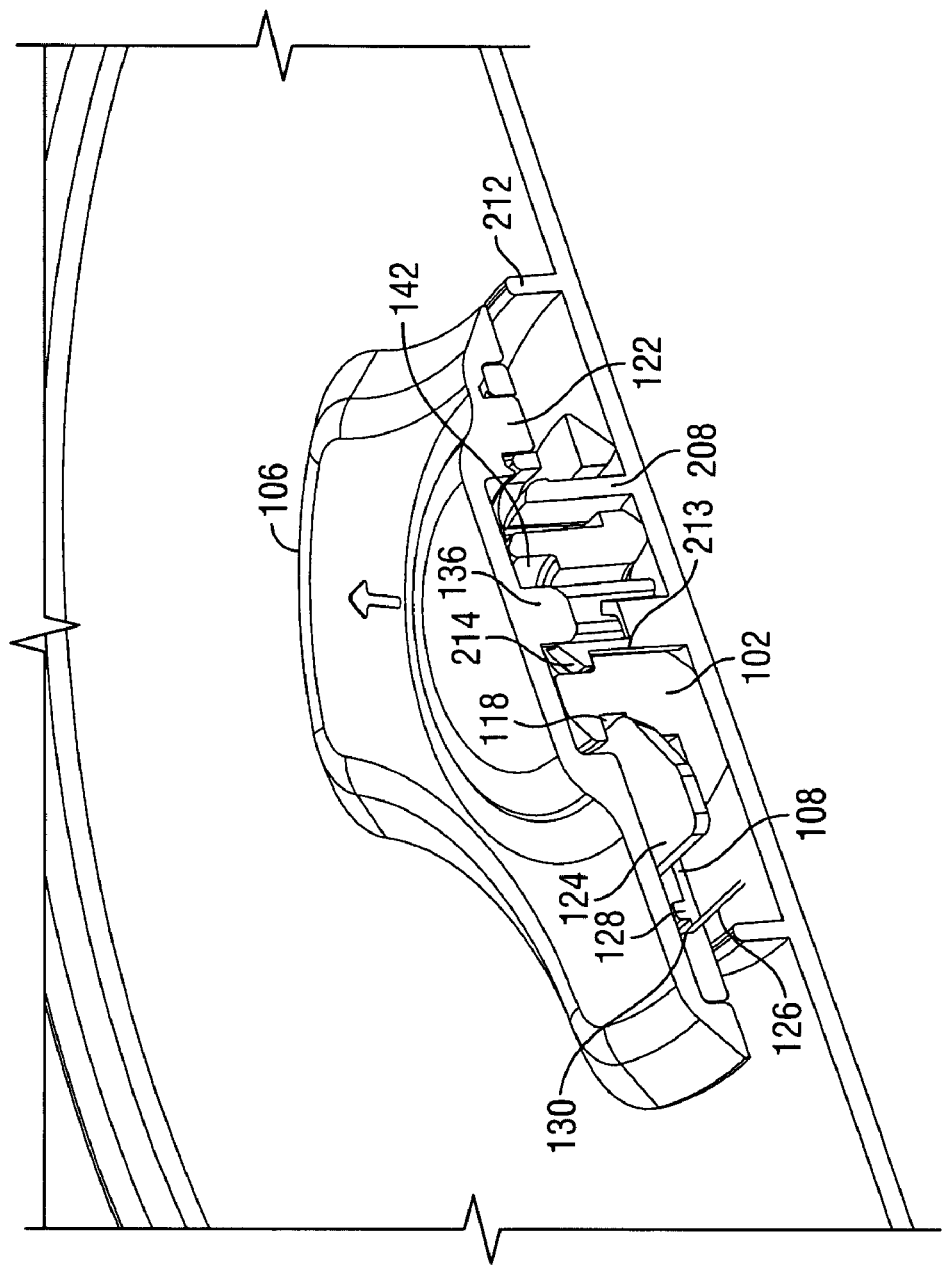
FIG. 11 is a partially cut-away perspective view of a portion of the assembly of FIG. 10 in accordance with the present invention.

As shown in FIG. 10, locking member 102 may engage base member 102 such that disc 300 is secured therebetween. In particular, latches 124 of locking member 104 may be received within receptacles 118 of base member 102. Arrow 138 of cover 106 and arrow 140 of base member 102 (see FIG. 9) may be used to align locking member 104 and base member 102 prior to coupling the locking member to the base member. As described hereinabove in connection with FIG. 2, protrusion 136 of cover 106 may impede snapping members 213 from flexing inward toward one another. Thus, when locking member 104 engages base member 102, the entirety of device 100 is secured within container due to the interaction of snapping members 213 with both indentation 142 and protrusion 136. FIG. 11 is a partially cut-away perspective view showing in detail the engagement between container 200, base member 102, and locking member 104 (for simplicity, disc 300 is not shown).

Disc 300 is secured between locking member 104 and base member 102 such that, if a thief attempts to remove the disc from container 200, the disc will break. Thus, in accordance with the present invention, benefit denial device 100 denies the thief the benefit of the asset (i.e., disc 300) secured by the benefit denial device.

To disengage locking member 104 from base member 102, thereby allowing disc 300 to be freely removed from container 200, a key arrangement may be provided. The key arrangement may have one or more magnets with one or more corresponding magnetic fields that cause latches 124 of locking member 104 to move in directions 134 (FIG. 3), thereby disengaging base member 102. A simplified illustration of such a key arrangement is shown in FIGS. 12–14.

Figure 12:
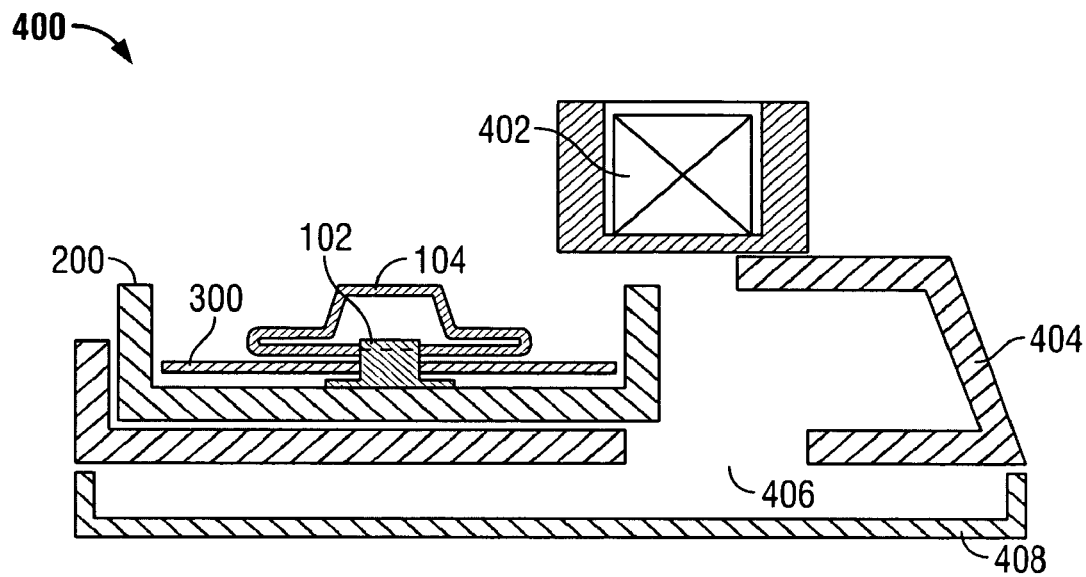
FIGS. 12–14 are simplified sectional views of an illustrative key arrangement in accordance with the present invention.
Figure 13:
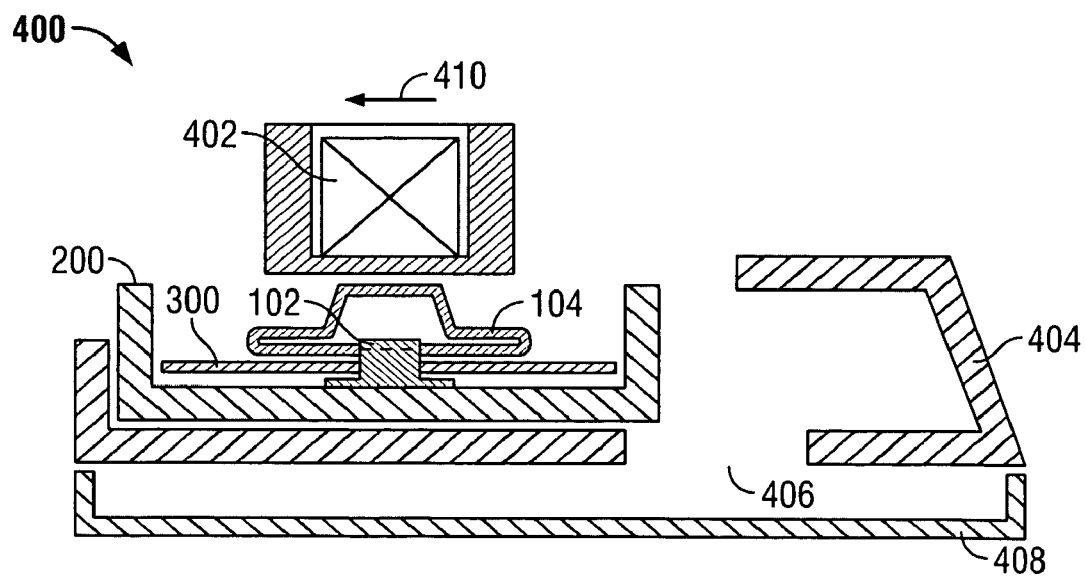
Figure 14:
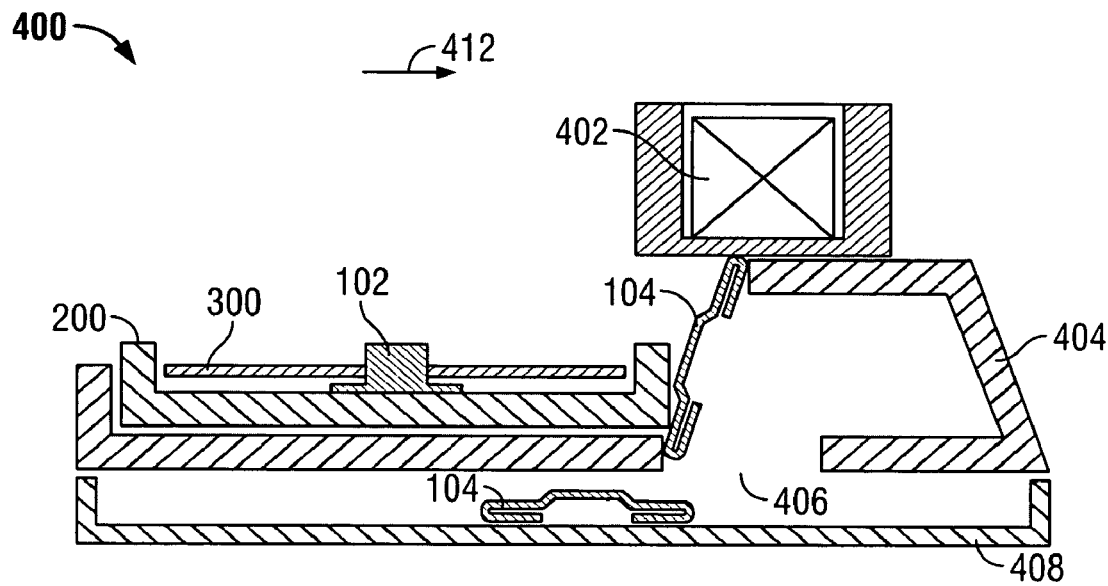

FIGS. 12–14 show simplified sectional views of an illustrative key arrangement 400 and a method for its use in accordance with the present invention. Because key arrangement 400 may be used to disengage locking member 104 from base member 102, key arrangement 400 may be referred to herein as decoupler 400. Decoupler 200 may include a magnetic arrangement 402. Magnetic arrangement 402 may include any suitable number of magnets. For example, decoupler 400 may include the same number of magnets as the number of latches 124 of locking member 104 (FIG. 1). Each magnet of magnetic arrangement 402 may be configured to act on a specific latch 124, such that the orientation of locking member 104 with respect to base member 102 affects whether decoupler 400 will be suitable to disengage the locking member from the base member. In some embodiments, the proper orientation of locking member 104 with respect to base member 106 may be achieved by aligning arrows 138 and 140, respectively (see FIG. 1).

Decoupler 400 may include a tray 404 which receives container 200 when it is desired to disengage locking member 104 from base member 102. Tray 404 may include an opening 406 that is in communication with a container 408. Container 408 may store locking members 104 as they are removed from each container 200.

To remove locking member 104 from container 200, first cover 202 of container 200 (FIG. 4) is opened such that locking member 104 is accessible. Container 200 is placed in tray 404 as shown in FIG. 12.

As shown in FIG. 13, magnetic arrangement 402 may slide in direction 410 toward container 200, such that locking member 104 is situated underneath magnetic arrangement 402. Once properly oriented beneath magnetic arrangement 402, plurality of latches 124 are attracted to one or more magnetic fields created by magnetic arrangement 402. This attraction causes latches 124 to move in directions 134, such that the latches are no longer received within receptacles 118. Once latches 124 disengage base member 102, locking member 104 is free to be removed from base member 102, which is facilitated by the attraction between latches 124 and magnetic arrangement 402.

Figure 15:
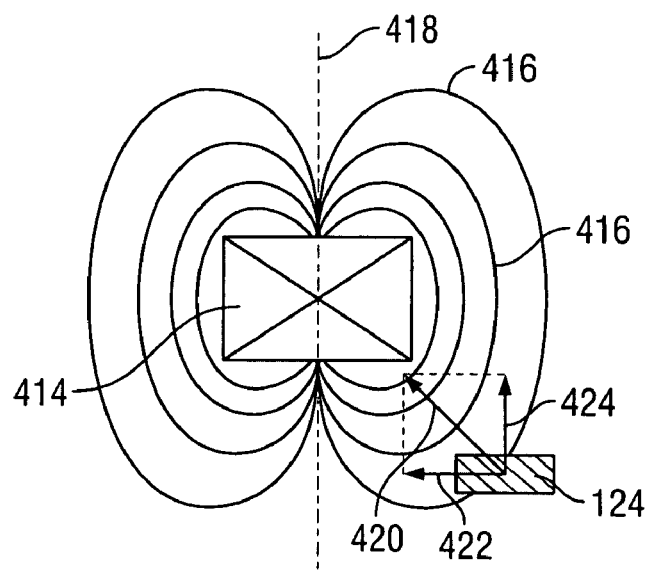
FIG. 15 is a simplified schematic view demonstrating the attraction between a magnet of the decoupling device of FIGS. 12–14 and a portion of the benefit denial device of FIG. 1 in accordance with the present invention.

A simplified schematic view demonstrating the attraction between an illustrative magnet 414 of magnetic arrangement 402 and a latch 124 is shown in FIG. 15. Magnet 414 creates a magnetic field that is illustrated with magnetic field lines 416. Field lines 416 demonstrate the strength of the magnetic field created by magnet 414 on latch 124. The magnetic field is strongest when latch 124 is along axis 418. Furthermore, magnet 414 attracts latch 124 towards the center of the magnet. Thus, when latch 124 is placed in magnetic field 416, a force 420 is exerted on latch 124. Force 120 may be separated into two components, a horizontal force 422 and a vertical force 424. Because latch 124 is located inside locking member 104 (FIG. 1), and more particularly because the latch is contained between retainer plate 108 and cover 106, the movement of the latch in the vertical direction is restrained. Thus, latch 124 is displaced in the direction of force 422 when magnetic field 416 is strong enough to overcome the force of spring 126 (FIG. 1).

Referring to FIG. 14, magnetic arrangement 402 and locking member 104 may slide in direction 412 such that, when the magnetic arrangement reaches tray 404, the further movement of locking member 104 in direction 412 is impeded by tray 404. This causes locking member 104 to be released from attraction with magnetic arrangement 402 such that it drops through opening 406 into container 408. With locking member 104 removed from its engagement with base member 102, disc 300 may be freely removed from container 200 without causing any damage to the disc. In other words, once locking member 104 is decoupled from base member 102, benefit denial device 100 no longer denies a customer the benefit of the asset (i.e., disc 300) stored within container 200.

Figure 16:
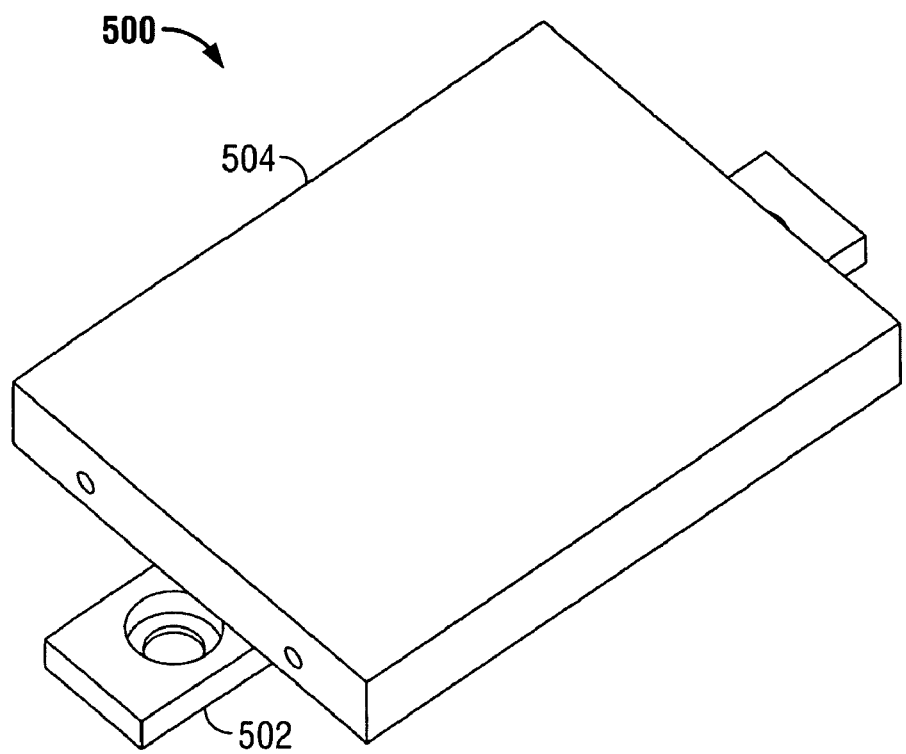
FIG. 16 is a perspective view of another illustrative benefit denial device in accordance with the present invention.
Figure 17:
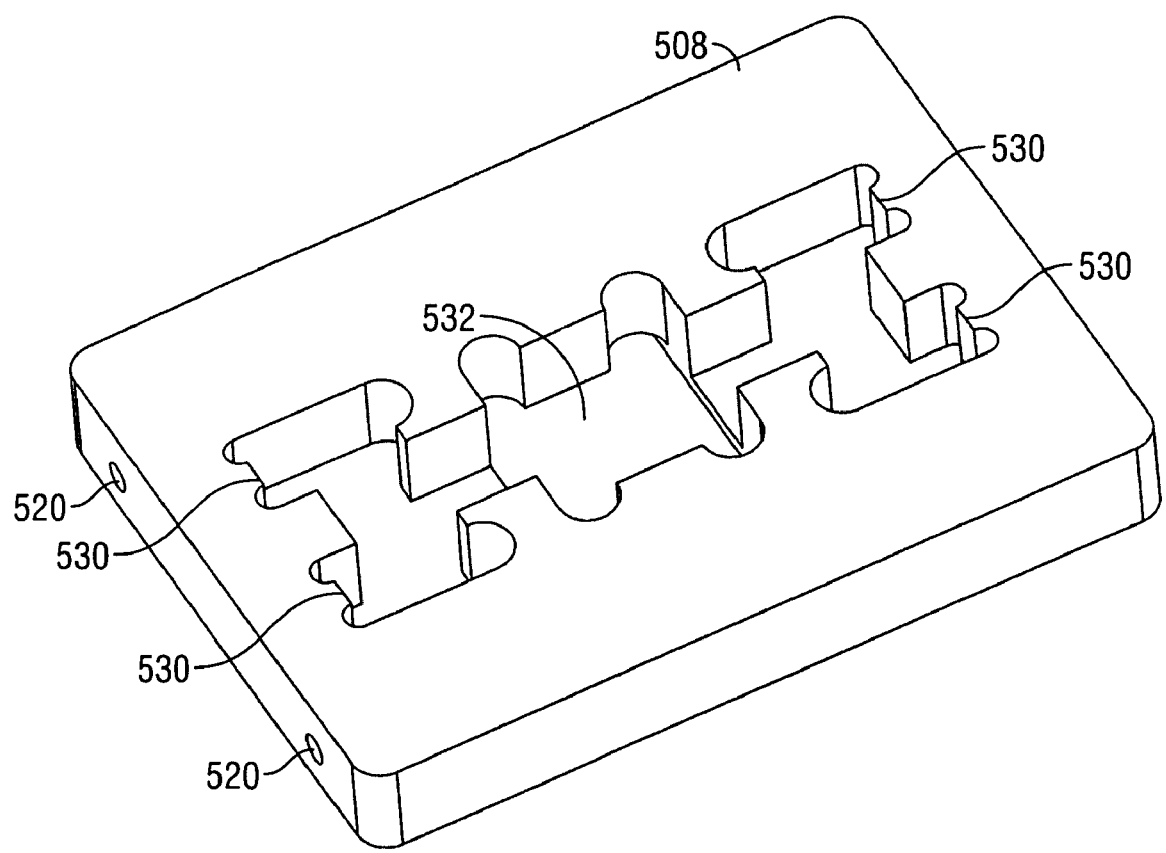
FIG. 17 is a perspective view of a portion of a locking member of the benefit denial device of FIG. 16 in accordance with the present invention.
Figure 18:
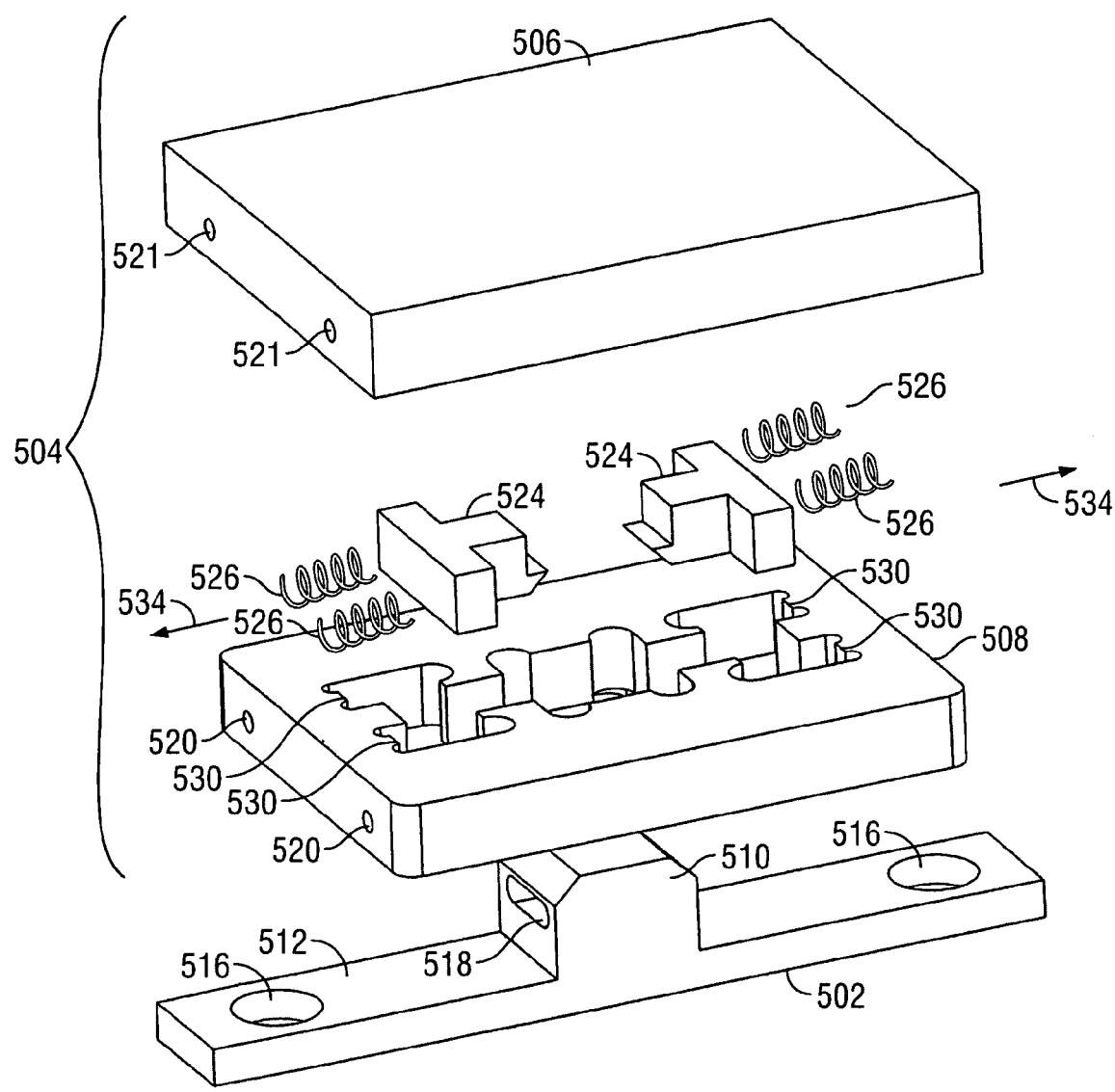
FIG. 18 is an exploded perspective view of the benefit denial device of FIG. 16 in accordance with the present invention.

FIGS. 16–18 show perspective views of another illustrative benefit denial device 500 in accordance with the present invention. Device 500 may include a base member 502 and a locking member 504. Locking member 504 may further include a cover 506 and a retainer plate 508.

Base member 502 may include a lock receiving portion 510 and a plate portion 512. In some embodiments of the present invention, base member 502 may be coupled to a container for storage media. For such coupling, base member 502 may include a plurality of openings 516 that extend through plate portion 512 and receive portions of the container (e.g., snapping mechanisms).

Base member 502 may include a plurality of receptacles 518 for receiving corresponding latches 524 of locking member 504 when the locking member is mated with the base member. In such a configuration, an asset may be secured between base member 502 and locking member 504.

Base member 502 may be constructed with a flat, solid base (with the exception of openings 516) to prevent access to lock receiving portion 510. In particular, this prevents access to latches 524 of locking member 504 when the latches are received within receptacles 518.

To secure an asset, base member 502 may interact with locking member 504 of device 500. As shown in FIG. 18, locking member 504 includes a cover 506 and a retainer plate 508. Cover 506 may be coupled to retainer plate 508 to form locking member 504.

For example, as shown in FIGS. 16–18, retainer plate 508 and cover 506 may include a plurality of sockets 520 and 521, respectively, to receive corresponding pins (not shown) in a press fit relationship, thereby coupling the cover and retainer plate together. However, this coupling is merely illustrative, and cover 506 may be coupled to retainer plate 508 in any suitable manner.

Locking member 504 may interact with base member 502 to secure an asset therebetween. Locking member 504, and in particular retainer plate 508, may include latches 524. Latches 524 may be coupled to retainer plate 508 with springs 526. Springs 526 may be attached to retainer plate 508 at locations 530. Springs 126 may be affixed to latches 524 and locations 530 in any suitable manner, such as by using an adhesive, a weld, or any other suitable means for attachment. Springs 526 may be, for example, helical compression springs that maintain the positioning of latches 524 (e.g., within receptacles 518 of base member 502). However, the example shown in FIG. 18 is merely illustrative, and springs 526 may be any other suitable type of spring.

Latches 524 may be configured such that, when locking member 504 is mated with base member 502, latches 524 are received within corresponding receptacles 518. When latches 524 are received within corresponding receptacles 518, base member 502 and locking member 504 are in a locked position. To remove locking member 504 from base member 502, a key arrangement may be provided (see, for example, key arrangement 400 of FIGS. 12–14) that acts upon latches 524 such that the latches are no longer received within receptacles 518. For example, the key arrangement may provide a force that compels each latch 524 to move in the direction shown by respective arrow 534 such that the latch is no longer received within respective receptacle 518. Preferably, the key arrangement provides a magnetic field using a combination of magnets, and latches 524 are constructed of a materials that reacts in the presence of a magnetic field.

As described hereinabove in connection with benefit denial device 100, latches 524 may be constructed such that the latches vary as to one or both of positioning with respect to retainer plate 508 and size. Such variation amongst latches 524 requires a key arrangement that is specific to the particular size and orientation of latches in the locking member, thereby making it more difficult for a thief to use a make-shift key arrangement to remove locking member 504 from base member 502.

When locking member 504 is mated with base member 502, lock receiving portion 510 of base member 502 may extend through opening 532 of retainer plate 508. In embodiments of the present invention in which device 500 is used in a container for storage media, and as described hereinabove, base member 502 may be snapped into place within the container such that snapping mechanisms of the container are received within openings 516 of base member 502.

Base member 502, cover 506, and retainer plate 508 may be constructed of any suitable materials that have a suitable strength and stiffness to resist tampering with device 500. Such materials may include, for example, a polyurethane resin (e.g., Isoplast® as manufactured by Dow Chemical Company), aluminum, aluminum alloy, stainless steel, or any other suitable material. Each of base member 502, cover 506, and retainer plate 508 (with the exclusion of latches 524) may be constructed of materials that do not react in the presence of a magnetic field.

Figure 19:
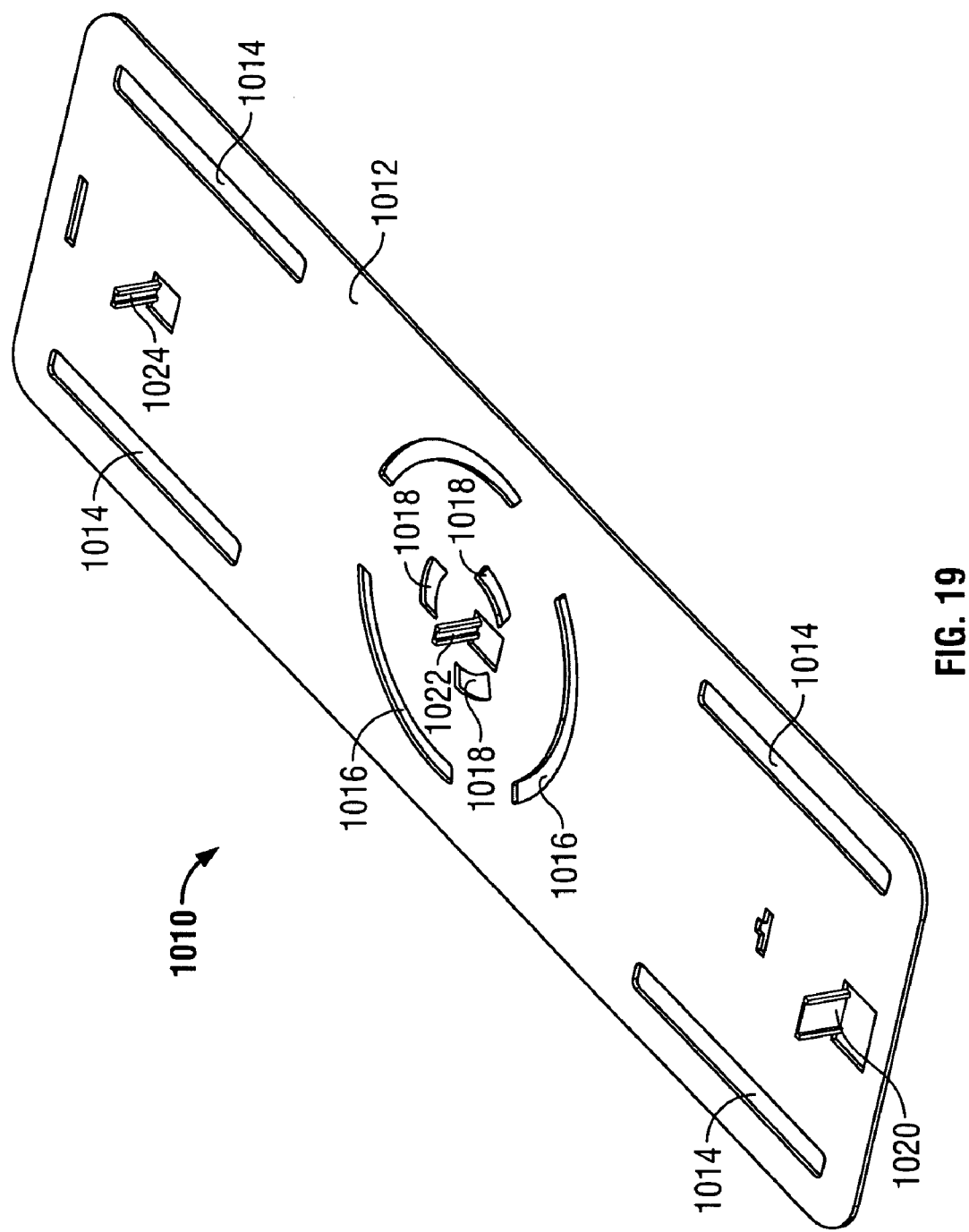
FIG. 19 is a perspective view of a portion of a base member of yet another illustrative benefit denial device in accordance with the present invention.

FIGS. 19–22 are perspective views of yet another illustrative benefit denial device 1000 in accordance with the present invention. FIG. 19 shows illustrative locking component 1010 in accordance with the present invention. Locking component 1010 may include locking plate 1012. Any number, pattern, or type of suitable locking mechanisms or structures may be present in locking component 1010. Any number or pattern of suitable slots 1014 and 1016 may be present in locking component 1010 to affix locking component 1010 to a container such as container 1100 (FIG. 23). Any number or pattern of slots 1018 may be present in locking component 1010 to allow a hub member to pass through locking component 1010. Any other suitable opening or openings may be present in locking component 1010. Locking component 1010 may be produced by stamping a single piece of material, such as metal, or any other suitable material.

Locking component 1010 may include locking mechanism 1020, locking mechanism 1022, and locking mechanism 1024. Locking mechanisms 1020, 1022 and 1024 may be molded as protrusions in locking component 1010.

Figure 20:
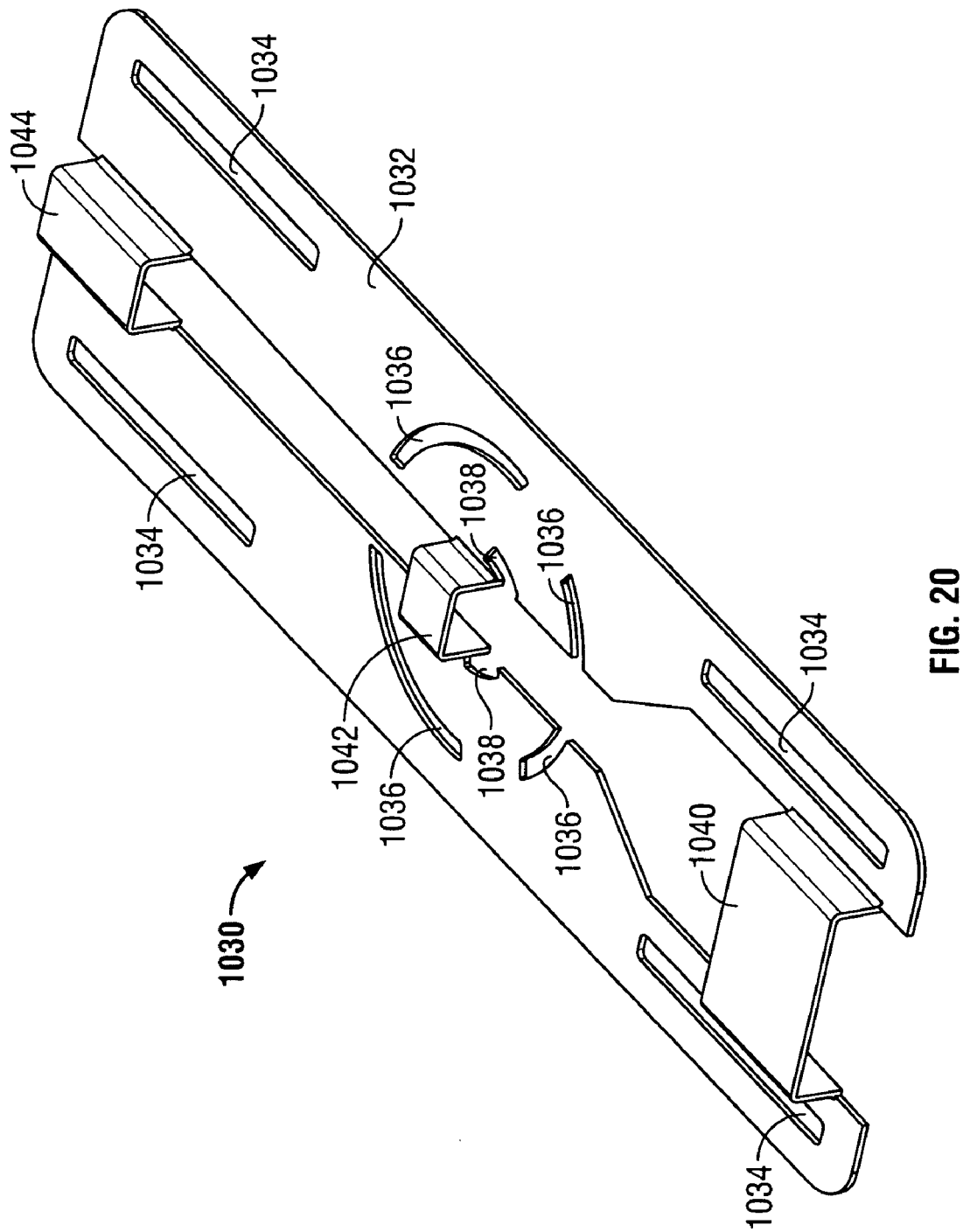
FIG. 20 is a perspective view of another portion of a base member of the benefit denial device in accordance with the present invention.

FIG. 20 shows an illustrative loop component 1030 according to the present invention. Loop component 1030 may include loop plate 1032. Any number, pattern, or type of suitable loops or structures may be present in loop component 1030. Any number or pattern of suitable slots 1034 and 1036 may be present in loop component 1030 to affix loop component 1030 to a container such as container 1100 (FIG. 23). Any number or pattern of slots 1038 may be present in loop component 1030 to allow a hub member to pass through loop component 1030. Any number or pattern of openings such as loops 1040, 1042 and 1044 may be present in loop component 1030 to facilitate movement or guide a locking member through loop component 1030. Any openings in locking component 1010 may or may not correspond to openings that may be present in loop component 1030. Any other suitable opening or openings may be present in loop component 1030. Loop component 1030 may be produced by stamping a single piece of material, such as metal, or any other suitable material.

Loops 1040, 1042 and 1044 may be formed by any suitable method, such as stamping loop component 1030, molding loop component 1030, or any other suitable method.

Figure 21:
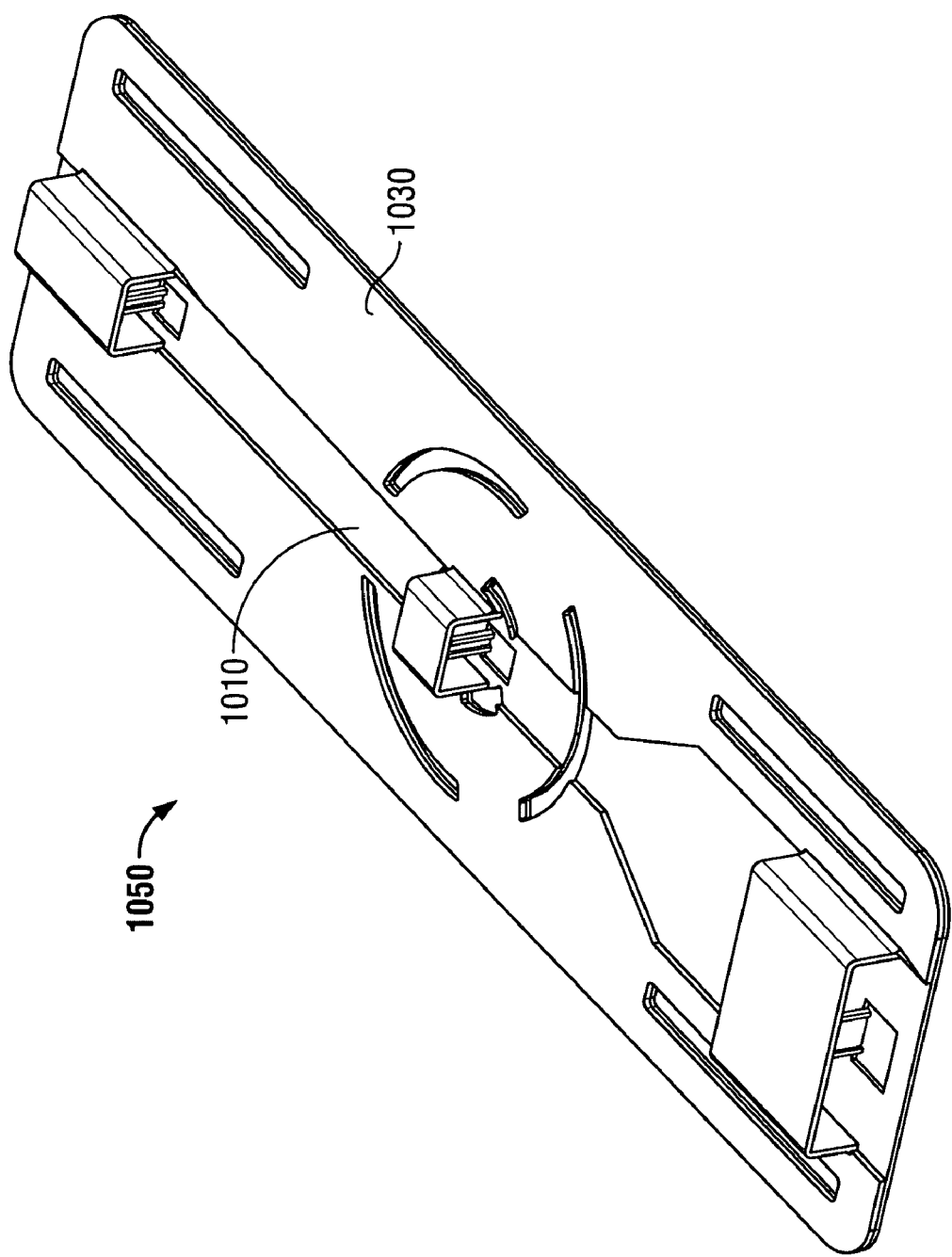
FIG. 21 is a perspective view of an assembly of the base member portions of FIGS. 19 and 20 in accordance with the present invention.

FIG. 21 shows a base assembly 1050 that includes the combination of locking component 1010 and loop component 1030. Loop component 1030 may be fixed to locking component 1010 using, for example, tack welding, spot welding, gluing, riveting, or any other suitable method. Locking component 1010 and loop component 1030 may be affixed to any suitable portion of container 1100 (FIG. 23) using, for example, heat staking, or any other suitable method. In some embodiments, each of locking component 1010 and loop component 1030 may be affixed to container 1100 independently of each other.

Figure 22:
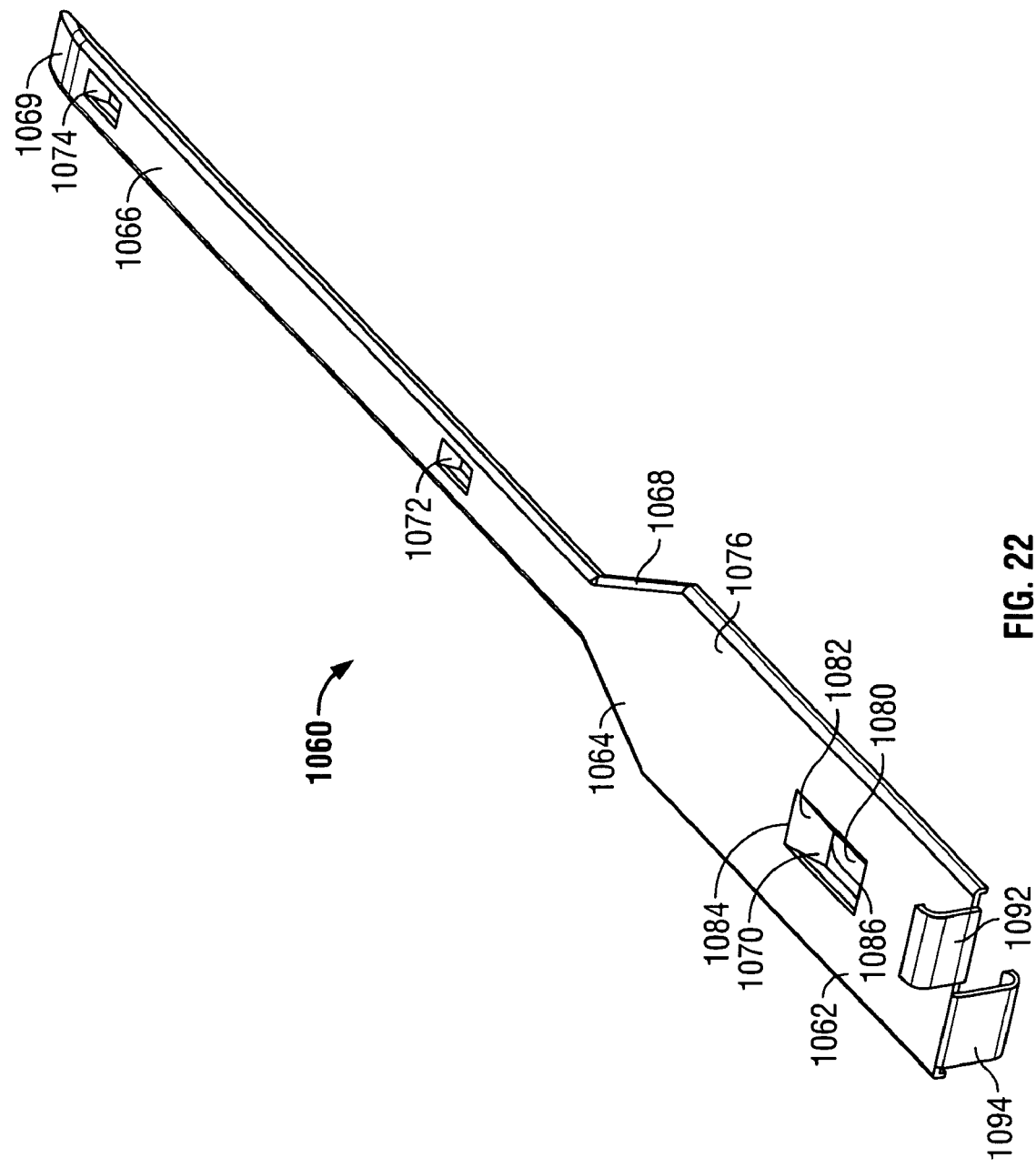
FIG. 22 is a perspective view of a locking member of the benefit denial device in accordance with the present invention.
Figure 23:
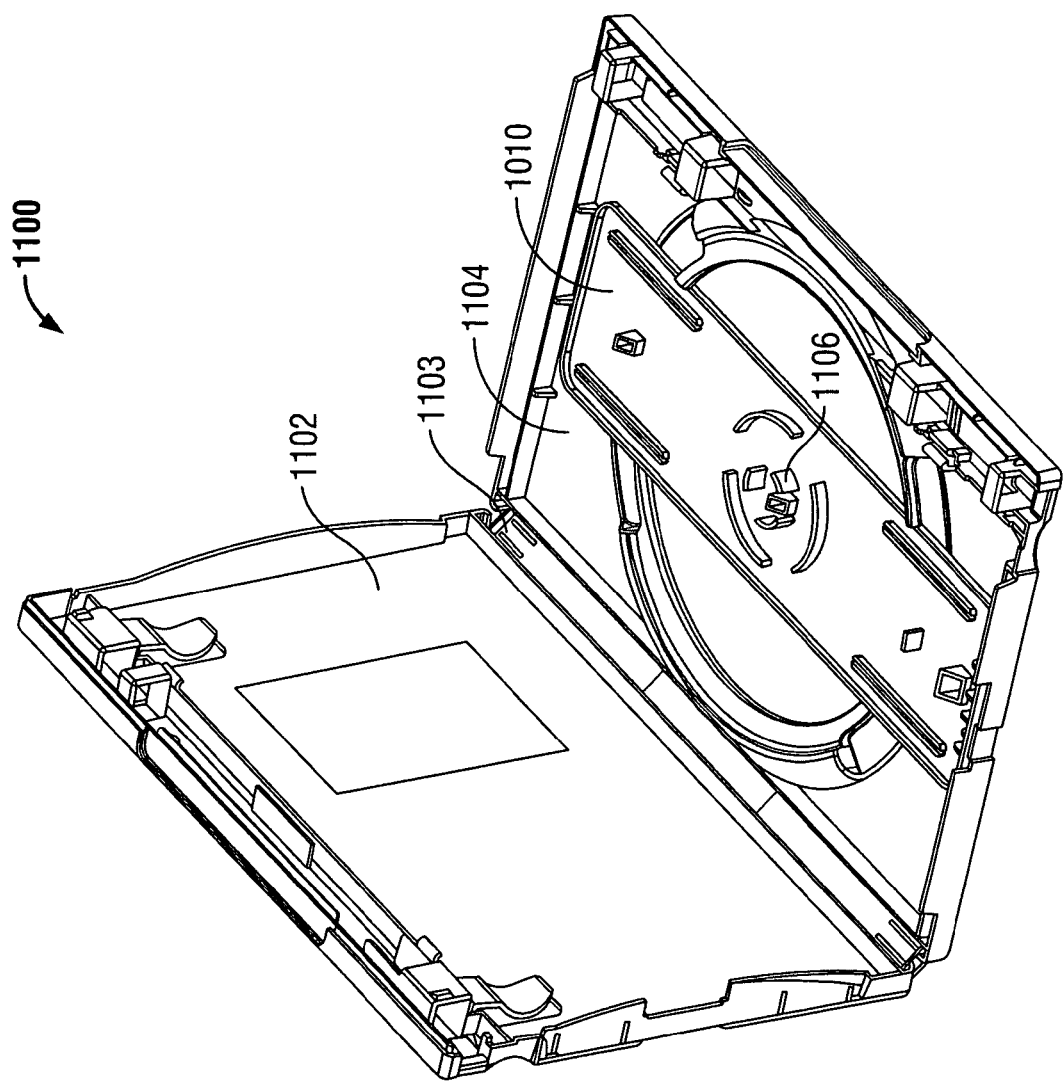
FIG. 23 is a perspective view of an illustrative container for use with the benefit denial device and the portion of base member shown in FIG. 19 in accordance with the present invention.

FIG. 22 shows an illustrative locking member 1060. Locking member 1060 may include proximal portion 1062, transitional portion 1064, and distal portion 1066. Transitional portion 1064 may include taper 1068. In some embodiments, proximal portion 1062 may be wider than distal portion 1066. In some embodiments, proximal portion 1062 may be narrower than distal portion 1066. In some embodiments, locking member 1060 may have a uniform width. In some embodiments, locking member 1060 may include multiple transitional and intermediate portions between proximal portion 1062 and distal portion 1066. Distal portion 1066 may include taper 1069.

Locking member 1060 may include one or more tab such as tabs 1070, 1072 and 1074. Illustrative tab 1070 may include a tip portion 1080. Tip portion 1080 may be connected to base 1076 with intermediate connector 1082. Tip portion 1080 may be connected to intermediate connector 1082 with a hinge 1086. Hinge 1086 may be a living hinge, a crimped angle, a stamped angle, or any other suitable hinge. Intermediate connector 1082 may be connected to base 1076 with hinge 1084. Hinge 1084 may be a living hinge, a crimped angle, a stamped angle, or any other suitable hinge.

One or both of hinges 1084 and 1086 may be configured to return to an equilibrium position when tip portion 1080 is displaced from the equilibrium position. An external force may displace a tab such as tab 1070 away from an equilibrium position such as that shown in the present figure. Such an external force may deflect tab 1070 either away from or towards base 1076. For example, when locking member 1060 is inserted into a loop such as loop 1040 (shown in FIG. 20), tab 1070 may come into contact with catch mechanism 1020 (shown in FIG. 19) and be deflected towards base 1076. When tab 1070 has passed beyond catch mechanism 1020, tab 1070 may return to its equilibrium position, further away from base 1076. Tab 1070 may then prevent locking member 1060 from being removed from container 1100.

Tabs 1072 and 1074 may be similar to tab 1070. In some embodiments, all tabs may be different. Tabs 1070, 1072, and 1074 may be constructed from a variety of materials such as, for example, metal, plastic, carbon fiber, or any other suitable material. Tabs may be arranged in any suitable geometry along base 1076 of locking member 1060 between distal end 1062 and proximal end 1066. In some embodiments, tabs may be positioned side-by-side. Locking member 1060 may be configured to include any suitable number of tabs.

Locking member 1060 may be configured to fit over an asset such as a disc in container 1100 (FIG. 23) with enough clearance so as not to damage the asset or the disc. In some embodiments, locking member 1060 may include a scratch-proof material, such as felt, on distal portion 1066.

Locking member 1060 may include first catch 1092 and second catch 1094. Catches 1092 and 1094 may be configured to engage a portion of a container such as container 1100 (FIG. 23).

FIG. 23 shows an illustrative container 1100 in accordance with the present invention. Container 1100 may comprise a first cover 1102 and a second cover 1104. First cover 1102 and second cover 1104 may be coupled together by hinge 1103. Hinge 1103 may include a flexible web of material (e.g., a living hinge).

Container 1000 may include a hub 1106. Hub 1106 may extend from second cover 1104 and may be formed by any suitable process such as, for example, molding or any other suitable process. Hub 1106 may be configured to receive any suitable asset such as, for example, a CD, a DVD, a video game, or any other suitable asset.

Container 1100 may include locking component 1010. Locking component 1010 may be attached to container 1000 independently of loop component 1030. The presence of locking component 1010 in container 1000 does not affect the ability of hub 1106 to retain an asset.

Figure 24:
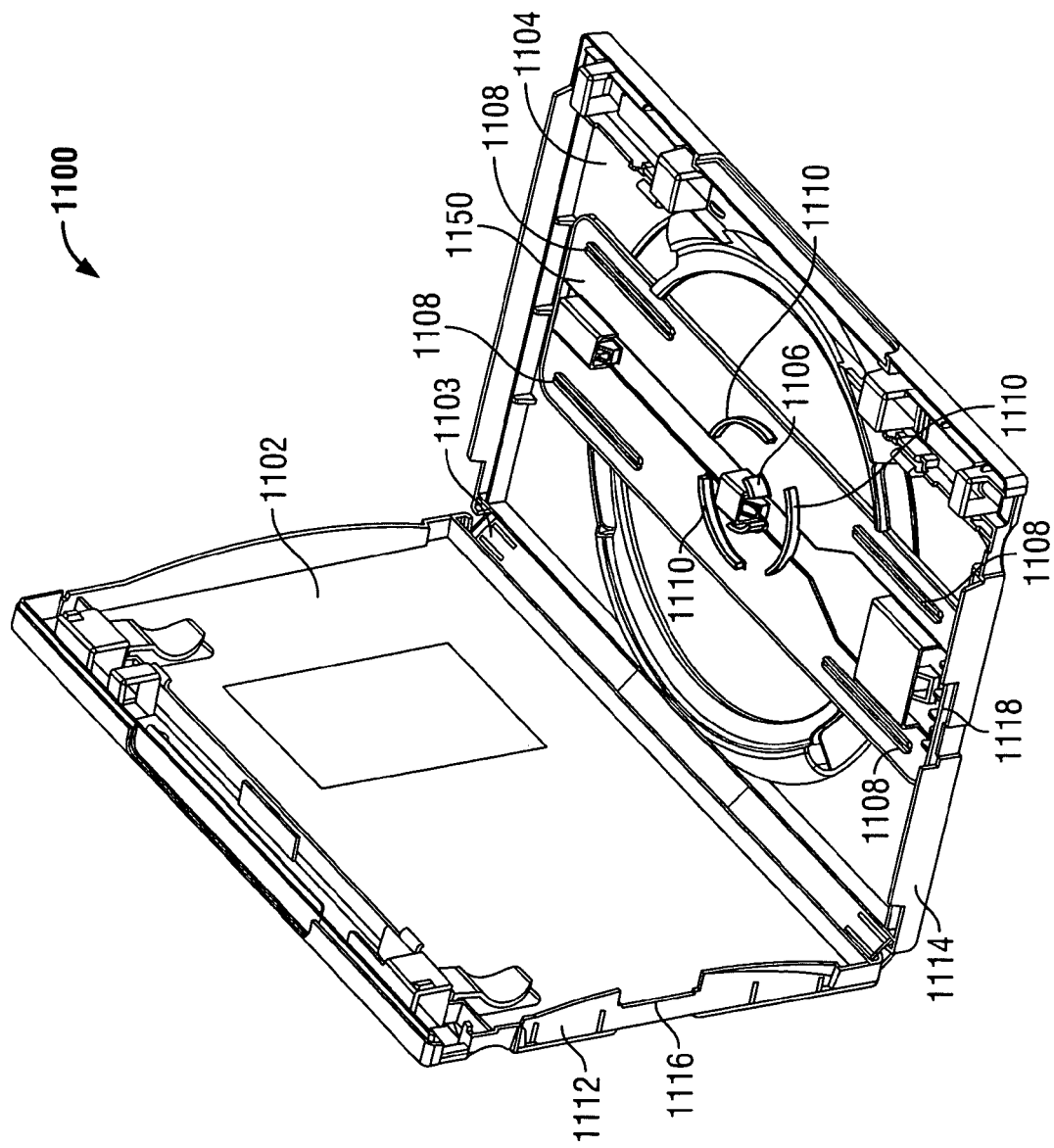
FIG. 24 is perspective view of the container of FIG. 23 and the assembly of FIG. 21 in accordance with the present invention.

FIG. 24 shows container 1100 from FIG. 23 with loop component 1030 (FIG. 20). Container 1100 may include protrusions 1108 and 1110. Protrusions 1108 and 1110 may extend from second cover 1104 through openings in base assembly 1050 (FIG. 21) to secure base assembly 1050 to second cover 1104. In some embodiments, protrusions 1108 and 1110 may be molded and, after positioning openings in base assembly 1050 over protrusions 1108 and 1110, deformed by heat staking. In some embodiments, protrusions 1110 may be configured to be a shelf on which an asset, such as a disc, may rest.

Some embodiments of the invention may include at least one snap. In some embodiments, the snap may be used to removably affix a feature of the invention to container 1100. In some embodiments, the snap may be used to permanently affix a feature of the invention to the container. In some embodiments, one or more snaps may be used to affix base assembly 1050 to container 1100. For example, one or more female snap components (not shown) may be present on base assembly 1050. A male counterpart (not shown) for each female component may be present on second cover 1104. The male and female components may be aligned so that base assembly 1050 may be snapped into place on second cover 1104. In some embodiments, the male and female snap components may be snapped together by hand. In some embodiments, a special tool (not shown) may be provided to snap the male and female snap components together. In some embodiments, a portion of one or more of the male and female snap components may be injection molded. In some embodiments, a portion of one or more of the male and female snap components may be made of metal. In some embodiments, a female component may be affixed to container 1100 and a male component may be affixed to base assembly 1050.

In some embodiments, the present invention may include one or more male components for which a female counterpart is not present. In some embodiments, the invention may include one or more female components for which a male counterpart is not present. In some embodiments, second cover 1104 may include snaps positioned to couple to more than one style or shape of base assembly 1050. In some embodiments, second cover 1104 may include snaps positioned to couple to more than one pattern of snaps on base assembly 1050. In some embodiments, base assembly 1050 may be configured to be snappable to container 1100 in one of a selection of positions.

Side walls 1112 and 1114 may include cuts 1116 and 1118, respectively. Cuts 1116 and 1118 may be configured to allow locking member 1060 to fit through walls 1112 and 1114 when container 1200 is closed.

Figure 25:
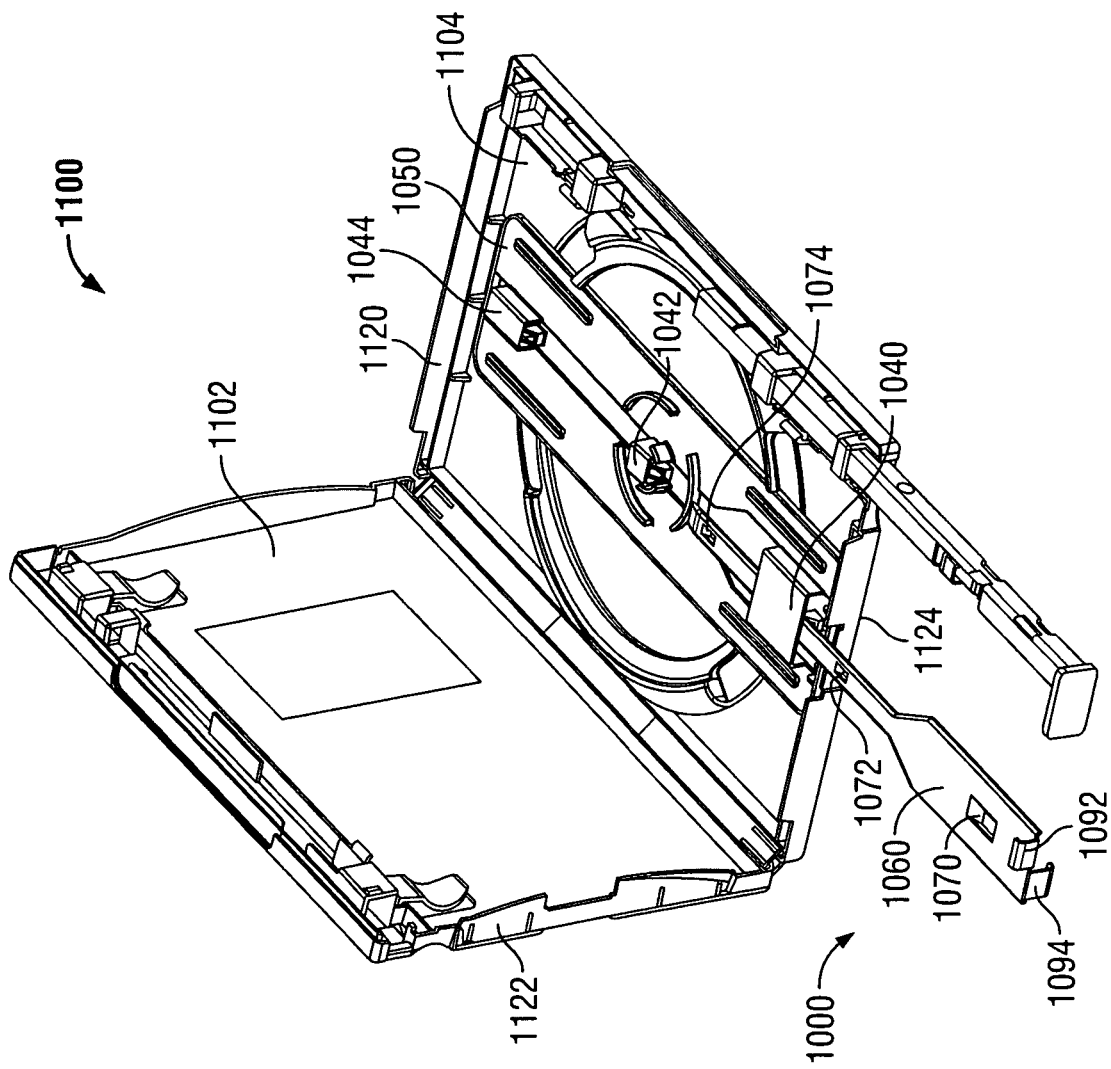
FIG. 25 is a perspective view of the assembly of FIG. 24 and the locking member of FIG. 22 in accordance with the present invention.

As shown in FIG. 25, locking member 1060 may be inserted into the assembly of base assembly 1050 and container 1100. Locking member 1060 may be configured to fit through loops 1040, 1042 and 1044 to secure an asset in container 1100 when container 1100 is closed. Locking mechanisms 1020, 1022 and 1024 may be further configured to engage tabs 1070, 1072 and 1074, respectively, when locking member 1060 is inserted through loops 1040, 1042 and 1044. One or more of loops 1040, 1042 and 1044 may include extensions that block mechanical access to interior portions of the loops. Tabs 1070, 1072 and 1074 may be configured to engage locking mechanisms 1020, 1022 and 1024 under loops 1040, 1042 and 1044, respectively, to block access to the tabs and locking mechanisms. For example, loop 1044 may include a barrier (not shown) adjacent wall 1120 of second cover 1104 to prevent tampering with one or both of tab and locking mechanism 1074 and 1024 when the tab is engaged with the locking mechanism.

Locking member 1060 may include catches 1092 and 1094. Catch 1092 may be configured to engage top portion 1122 of first cover 1102 when container 1100 is closed and locking member 1060 is fully inserted into container 1100. Catch 1094 may be configured to engage bottom portion 1124 of second cover 1104 when container 1100 is closed and locking member 1060 is fully inserted into container 1100. Catches 1092 and 1094 may be configured to prevent container 1100 from being opened when container 1100 is closed and locking member 1060 is inserted into the container.

Figure 26:
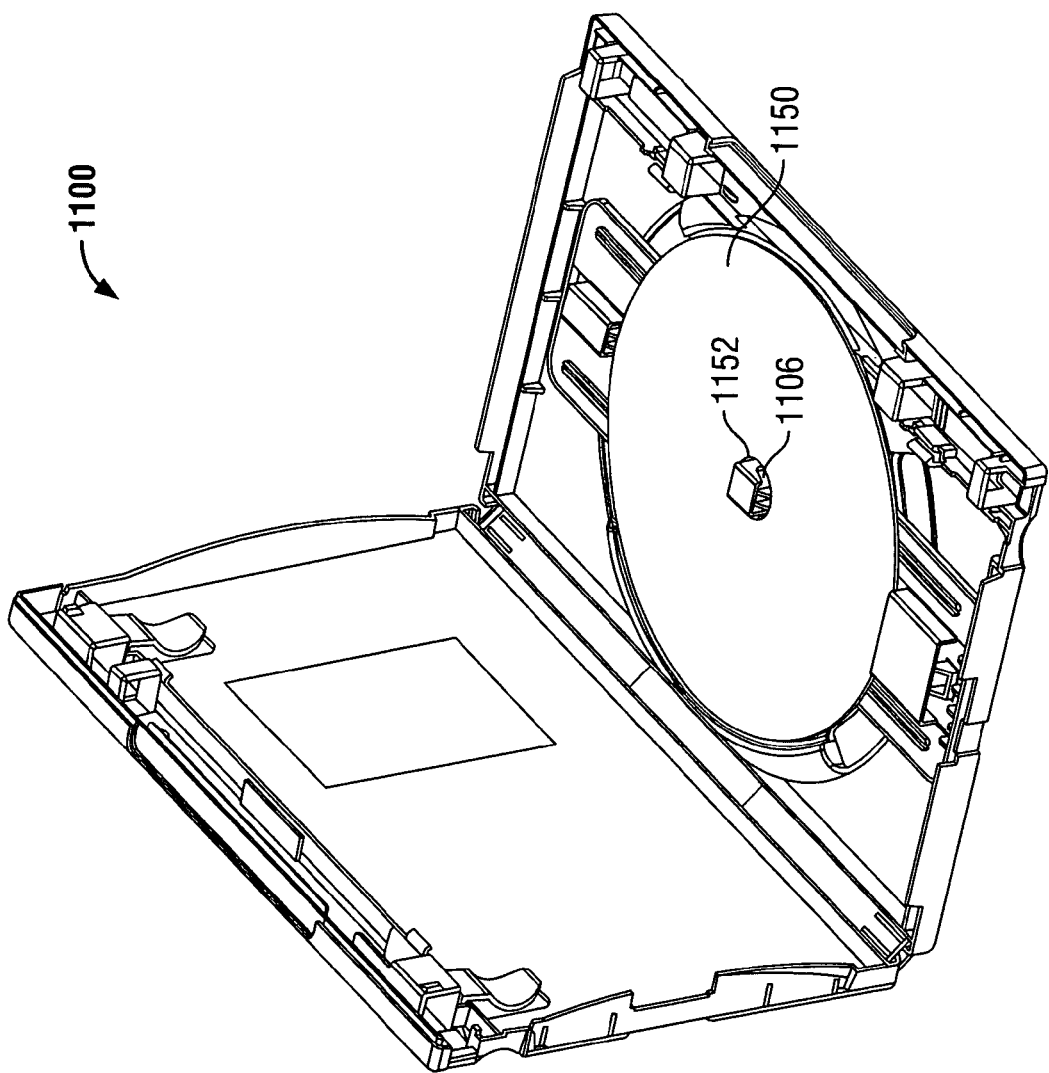
FIG. 26 is a perspective view of the assembly of FIG. 25 and an illustrative storing medium in accordance with the present invention.

FIG. 26 shows container 1100 with a disc 1150 detachedly retained by hub 1106. As shown, inner hole 1152 of disc 1150 may engage hub 1106 and thus be retained within container 1100 in the absence of locking member 1060. Locking member 1060 is not required for container 1100 to have the ability to retain an asset. Base assembly 1050 may be configured not to interfere with the function of hub member 1106.

Figure 27:
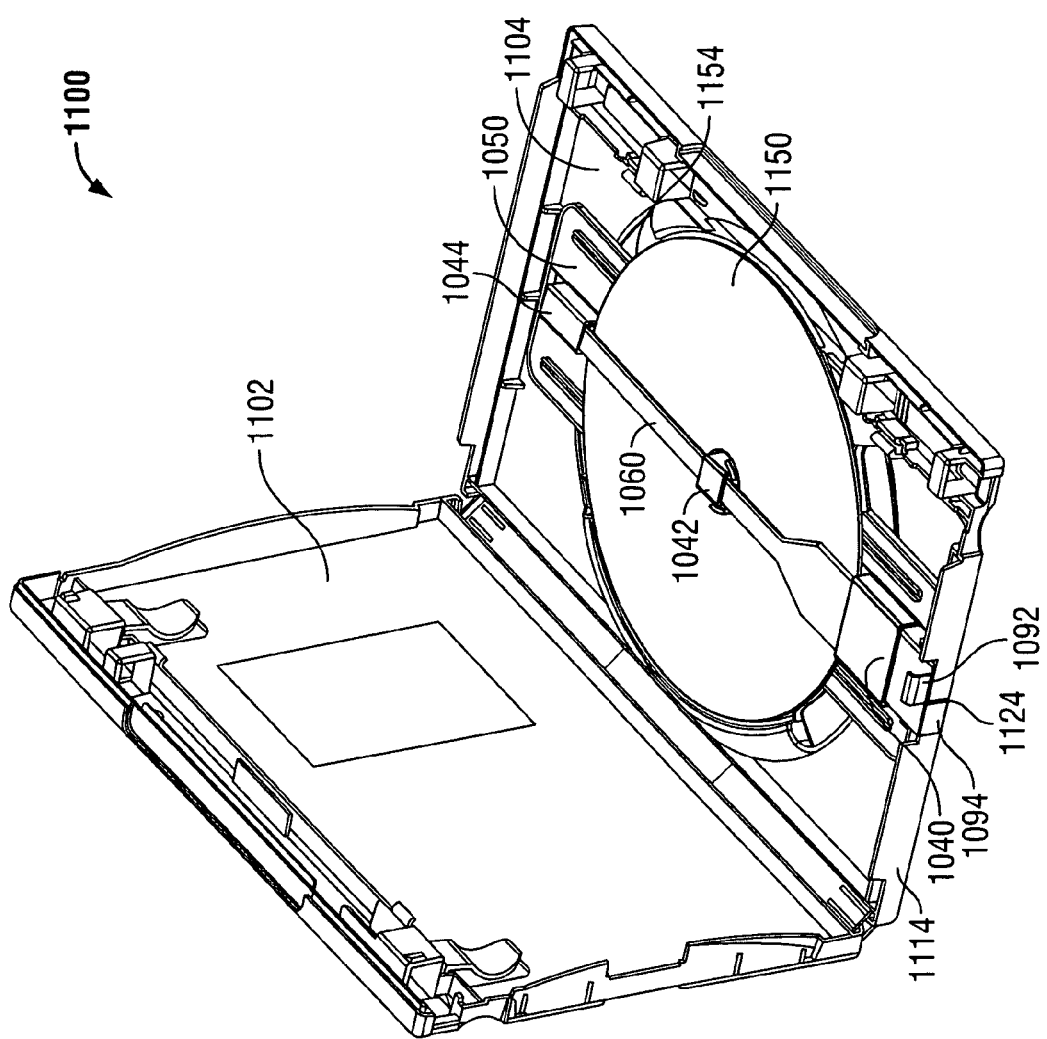
FIG. 27 is a perspective view of the assembly of FIG. 26 and the locking member of FIG. 22 in accordance with the present invention.

FIG. 27 shows container 1100, base assembly 1050, and disc 1150 of FIG. 26. Furthermore, locking member 1060 is fully inserted in container 1100 through loops 1040, 1042 and 1044 of base assembly 1050. Locking member 1060 is positioned above disc 1150. Tabs 1070, 1072 and 1074 of locking member 1060 may be engaged with locking mechanisms 1020, 1022 and 1024 beneath portions of loops 1040, 1042 and 1044, respectively. Portions of base assembly 1050 may be visible outside perimeter 1154 of disc 1150.

Figure 28:
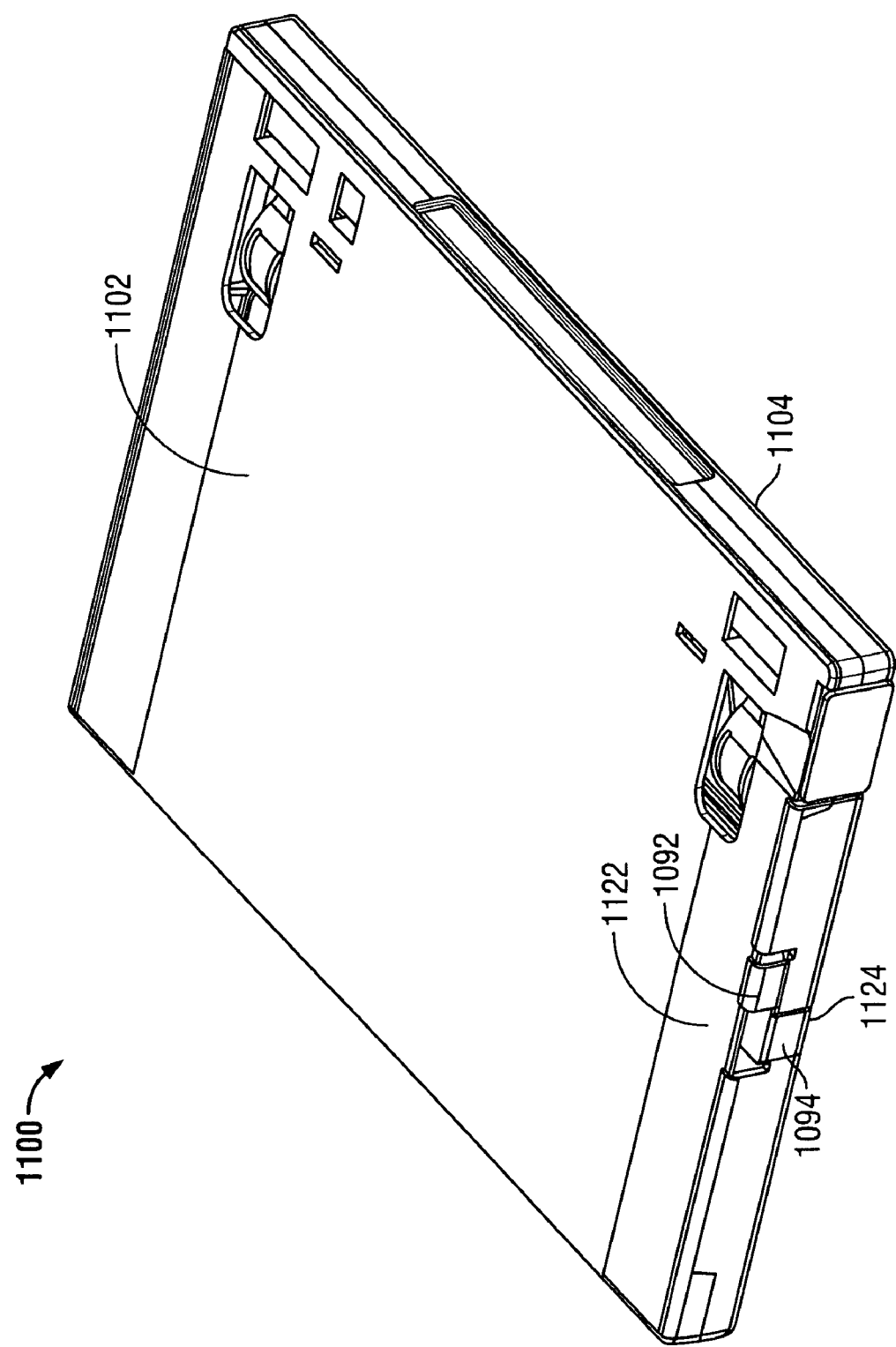
FIG. 28 is a perspective view of the assembly of FIG. 27 when the container is in a closed position in accordance with the present invention.

FIG. 28 shows container 1100 when the container is closed. When locking member 1060 is inserted in container 1100, catch 1092 may engage top portion 1122 of first cover 1102, and catch 1094 may engage bottom portion 1124 of second cover 1104. Catches 1092 and 1094 may be substantially flush with walls 1112 and 1114 of first and second covers 1102 and 1104, respectively. Catches 1092 and 1094 may prevent container 1100 from being opened by holding coupled covers 1102 and 1104 in a closed position. To open container 1100 to access the asset enclosed therein, locking member 1060 is removed from container 1100.

Figure 29:
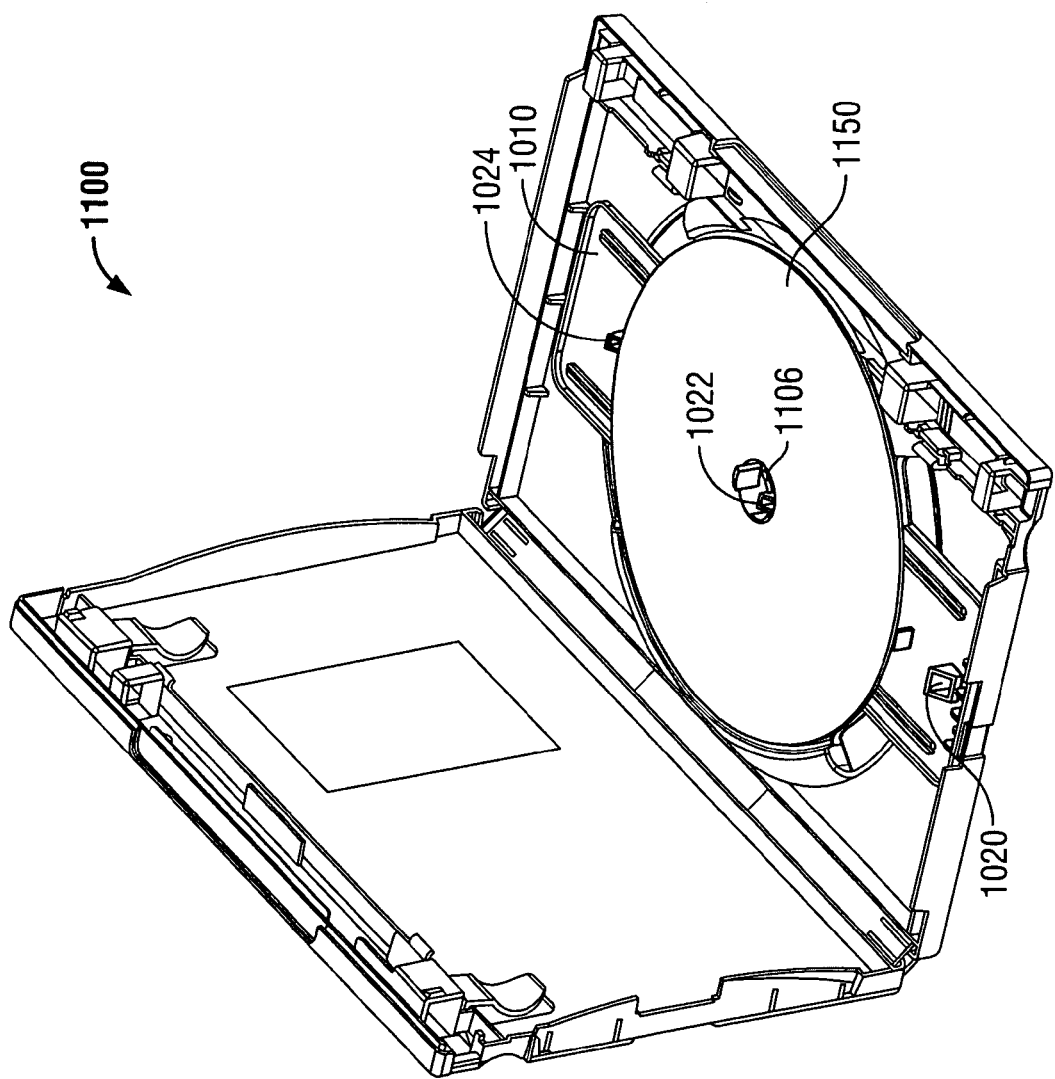
FIG. 29 is a perspective view of the container and the portion of base member shown in FIG. 19 along with an illustrative storage medium in accordance with the present invention.

FIG. 29 shows container 1100 and locking component 1010 with disc 1150 detachedly retained by hub 1106. As shown, disc 1150 may be retained in container 1100 in the absence of loop component 1030. Locking mechanisms 1020, 1022 and 1024 may be visible underneath disc 1150.

Figure 30:
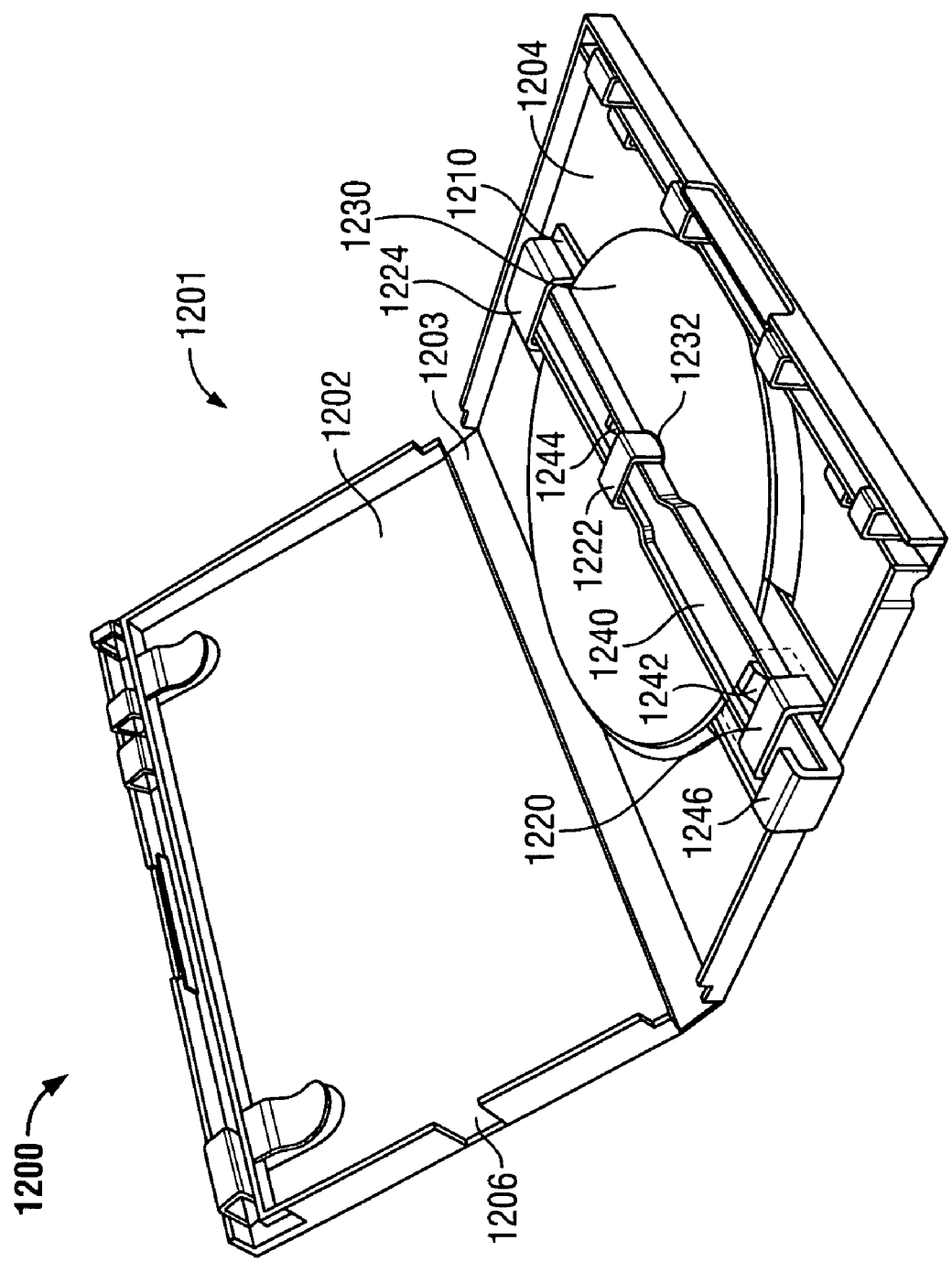
FIG. 30 is a perspective view of still another illustrative benefit denial device and an illustrative container for use with the benefit denial device in accordance with the present invention.

FIG. 30 shows a perspective view of still another illustrative benefit denial device 1200 in accordance with the present invention. Container 1201 may include first cover 1202 and second cover 1204 coupled together by hinge 1203. Container 1201 may be configured to receive base assembly 1210 on the inner surface of second cover 1204. Base assembly 1210 may include loops 1220, 1222 and 1224. Container 1201 may be configured to receive disc 1230. Disc 1230 may be configured to be placed in container 1201 such that loop 1221 fits through inner hole 1232 of disc 1230.

Locking member 1240 may include tabs such as illustrative tabs 1242 and 1244. Locking member 1240 may include catch 1246 configured to engage top portion 1206 of first cover 1202 when container 1201 is closed and locking member 1240 is fully inserted into the container. Catch 1246 may prevent opening on container 1201 as long as locking member 1240 is placed within container 1201. Container 1201 and locking member 1240 may include any of the features described hereinabove in connection with container 1100 and locking member 1060.

Figure 31:
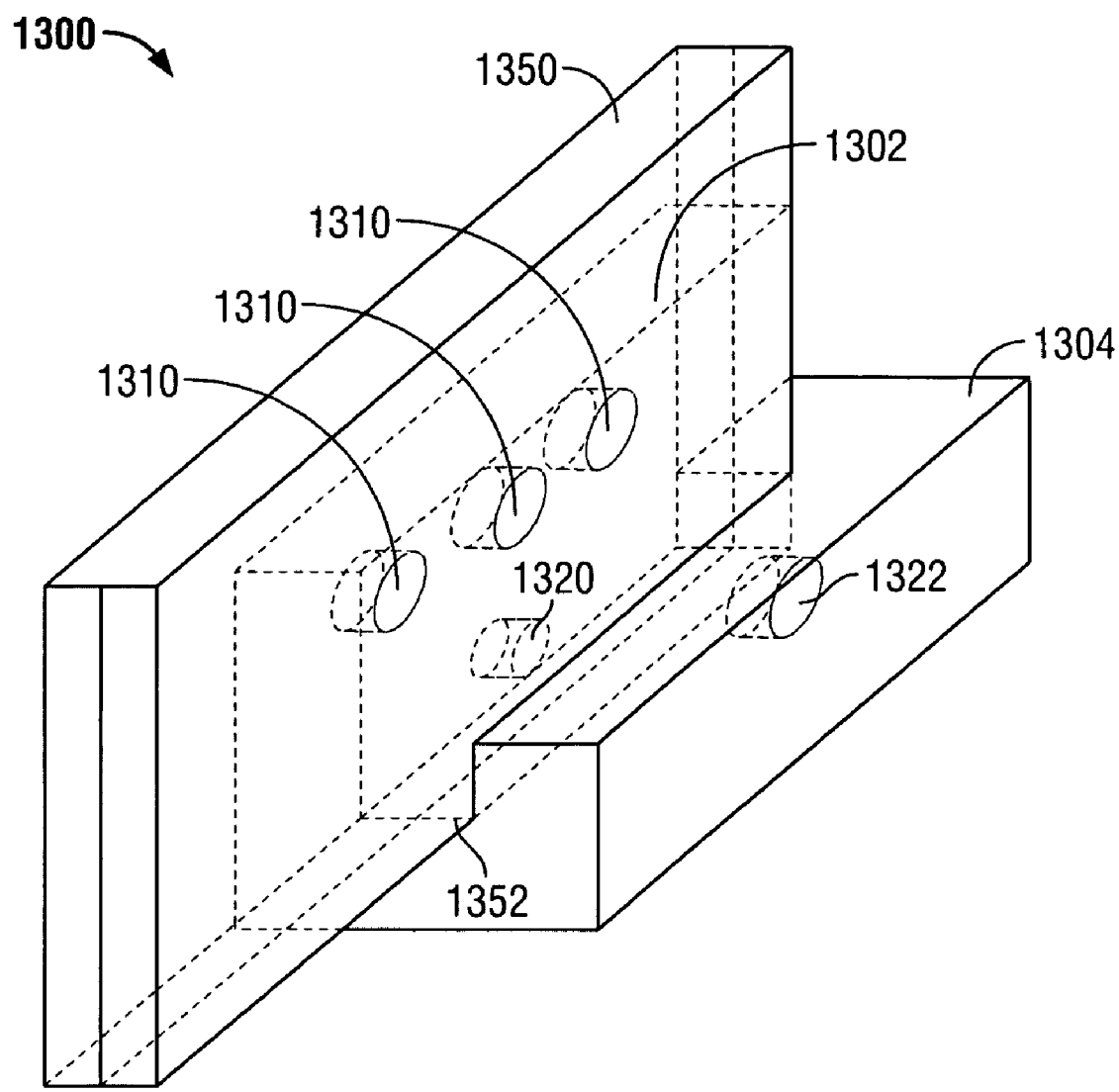
FIG. 31 is a perspective view of an illustrative key arrangement in accordance with the present invention.

FIG. 31 shows a perspective view of an illustrative key arrangement 1300 for use with, for example, benefit denial device 1000 in accordance with the present invention. Because key arrangement 1300 may be used to disengage locking member 1060 from base assembly 1050, it may be referred to herein as decoupler 1300. An illustrative container 1350 may be placed in decoupler 1300. Decoupler 1300 may include first portion 1302 and second portion 1304. In some embodiments, first portion 1302 may be configured to be larger than second portion 1304. In some embodiments, first portion 1302 may be configured to be smaller than second portion 1304. In some embodiments, first portion 1302 and second portion 1304 may be configured to be the same size. Decoupler 1300 may include one or more magnets 1310, 1320, and 1322. Magnets 1310, 1320, and 1322 may be located in any of first portion 1302 and second portion 1304. Magnets 1310, 1320, and 1322 may include one or more suitable types of magnets, such as, for example, an electromagnet, a permanent magnet, or any other suitable magnet. Decoupler 1300 may include slot 1352 configured to receive container 1350. Slot 1352 may be configured to receive any industry standard case.

When a locking member such as locking member 1060 is inserted into a closed container such as container 1100, and when tabs 1070, 1072 and 1074 are engaged with locking mechanisms 1020, 1022 and 1024, respectively, container 1100 is in a closed and locked state. Container 1100 may be placed in slot 1352 of decoupler 1300 to disengage tabs 1070, 1072 and 1074 and allow the removal of locking member 1060. Magnets 1310 may be configured to be aligned with tabs 1070, 1072 and 1074 and may apply a force to tabs 1070, 1072 and 1074 to draw or push tabs 1070, 1072 and 1074 towards base 1076 of locking member 1060 (FIG. 22). Tabs 1070, 1072 and 1074 may then be disengaged from catch mechanisms 1020, 1022, and 1024, and may allow locking member 1060 to be removed from container 1100. When locking member 1060 is removed from container 1100, the asset may be removed from container 1100.

Magnets 1320 and 1322 may be configured to allow a locking bar used to maintain container 1350 in a closed configuration to be removed from container 1100. Illustrative locking bars, and the systems and methods for removing the locking bars from a container, are described, for example, in Lax et al. U.S. patent publication No. US 2002/0023853, published Feb. 28, 2002, which is hereby incorporated by reference hereinabove.

Figure 32:
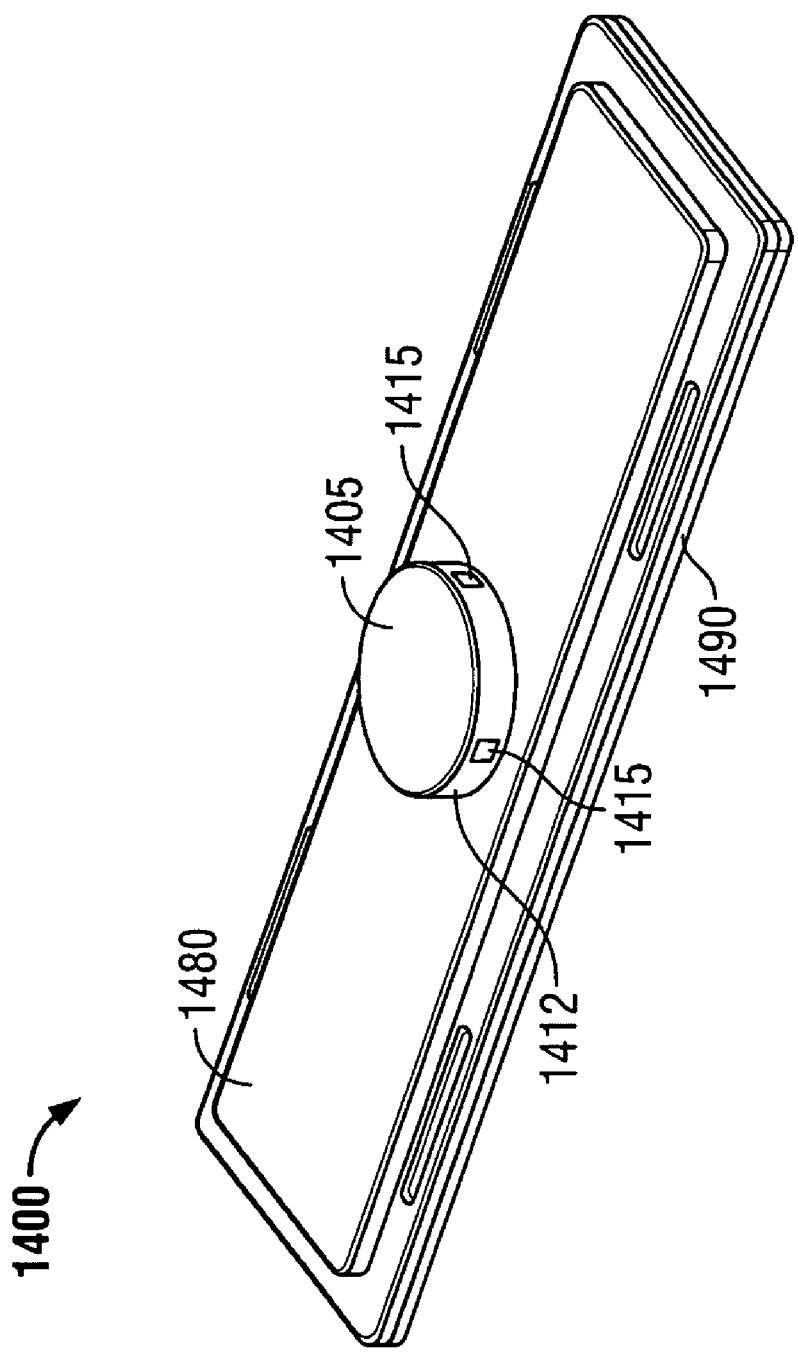
FIG. 32 is a perspective view of yet another illustrative benefit denial device in accordance with the present invention.
Figure 33:
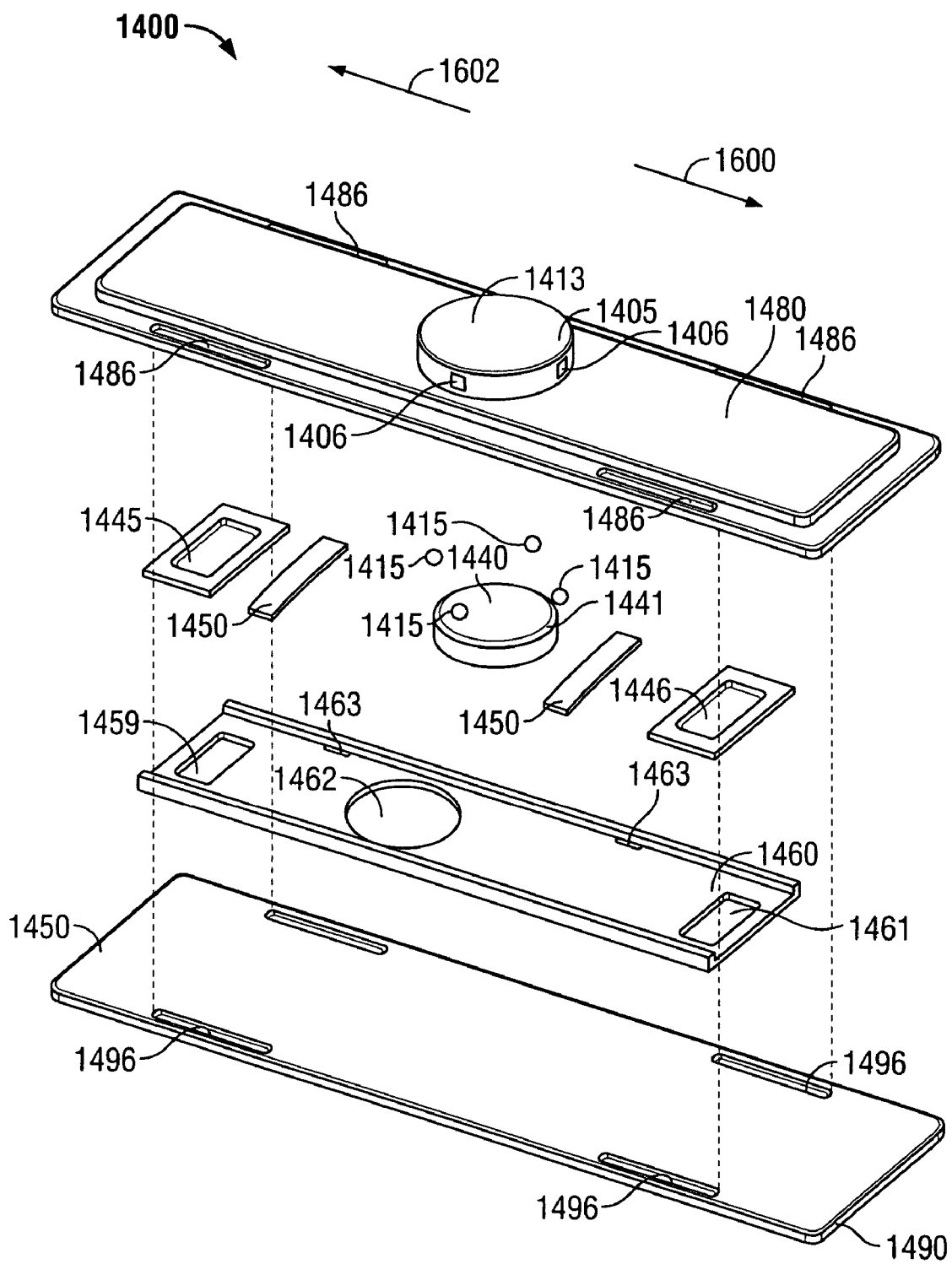
FIG. 33 is an exploded perspective view of the benefit denial device of FIG. 32 in accordance with the present invention.
Figure 34:
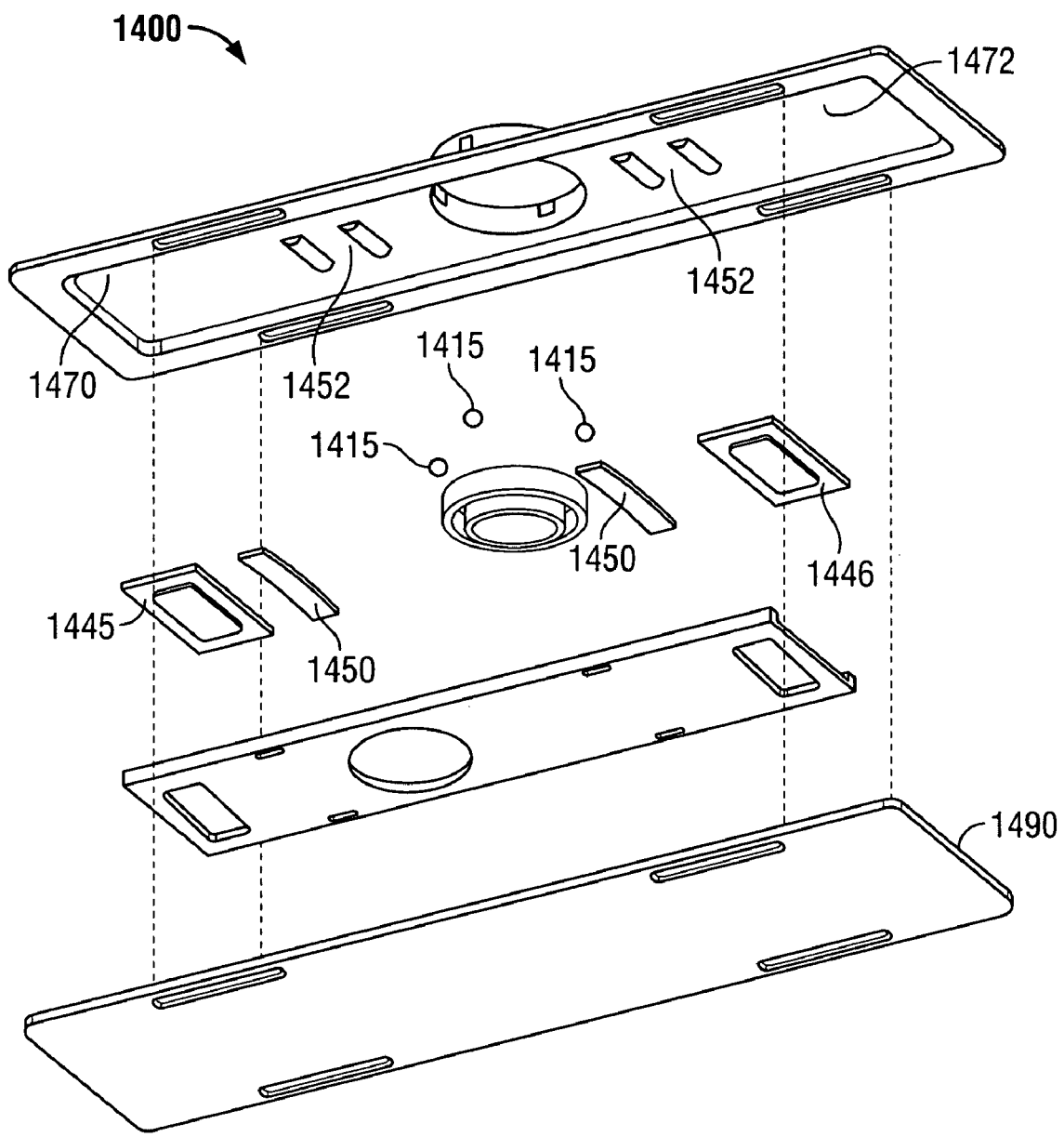
FIG. 34 is another exploded perspective view of the benefit denial device of FIG. 32 in accordance with the present invention.

FIGS. 32–34 show perspective views of yet another illustrative benefit denial device 1400 in accordance with the present invention. Device 1400 may include a cover member 1480 and a base member 1490. Cover member 1480 may include a hub portion 1405. Hub portion 1405 may include a plurality of openings 1406. As shown in the FIGS., hub portion 1405 includes four openings 1406. However, this is merely illustrative, and hub portion 1405 may include any suitable number of openings 1406.

Each opening 1406 may contain a locking member such as locking member 1415. Locking member 1415 may be, for example, a ball bearing. Each opening 1406 is sized such that a corresponding locking member 1415 may not fit through the opening and leave the confines of hub portion 1405. When device 1400 is in an unlocked state (i.e., an asset such as a disc may be removed from hub portion 1450), locking members 1415 may be free to move toward the center of hub portion 1405. It should be noted, however, that any further movement of locking members 1415 toward the center of hub portion 1405 is prevented by tapered edge 1441 of disc 1440. When device 1400 is in a locked position (i.e., an asset such as a disc is secured between locking members 1415 and cover 1480), locking members 1415 may be held within openings 1406 by disc 1440. In this locked position, an asset such as a disc will break if an attempt is made to remove the disc from hub portion 1405.

Device 1400 may include an actuator 1460. Actuator 1460 may include openings 1459 and 1461 for receiving tabs 1445 and 1446, respectively. Preferably, tabs 1445 and 1446 are constructed of a material that reacts to the presence of a magnetic field.

Actuator 1460 may include a disc receiving opening 1462 for receiving disc 1440. Actuator 1460 may include slots 1463 to receive the end portions of leaf springs 1450. Preferably, leaf springs 1450 are constructed of a material that reacts to the presence of a magnetic field.

Actuator 1460 may be acted upon by a suitable key arrangement to move disc 1440 into the locked an unlocked positions. For example, a suitable arrangement of magnets may be used to interact with tabs 1445 and leaf springs 1463 to move actuator 1460 in directions 1600 and 1602.

To move disc 1440 into the locked position, an illustrative magnetic arrangement may attract leaf springs 1450 such that the leaf springs no longer constrain the movement of actuator 1460 (i.e., leaf springs 1450 are no longer held between protrusions 1452 of cover 1480 (FIG. 34)). An additional magnetic arrangement may attract tab 1446 such that actuator moves in direction 1600. The movement of actuator 1460 in direction 1600 results in the positioning of disc 1440 on the surface of actuator 1460 (i.e., not within disc receiving opening 1462). This positioning of disc 1440 pushes locking members 1415 out such that they extend partially through openings 1406 of hub portion 1405 (see FIG. 36). This secures an asset between locking members 1415 and cover 1480 of device 1400.

To move disc 1440 into the unlocked position, an illustrative magnetic arrangement may attract leaf springs 1450 such that the leaf springs no longer constrain the movement of actuator 1460 (i.e., leaf springs 1450 may slide past protrusions 1452 of cover 1480 (FIG. 34)). An additional magnetic arrangement may attract tab 1445 such that actuator moves in direction 1602. The movement of actuator 1460 in direction 1602 results in the positioning of disc 1440 within disc receiving opening 1462. This positioning of disc 1440 allows locking members 1415 to move out of openings 1406 in hub portion 1405. This allows the removal of an asset from device 1400.

Device 1400 may include component 1445. Component 1445 may be metallic. In a preferred embodiment, component 1445 may react to the presence of a magnetic field. Hub base assembly 1410 may include any suitable number of components such as component 1445.

Hub base assembly 1410 may include leaf spring 1450. Leaf spring 1450 may be made from leaf spring steel or any other suitable material. Hub base assembly may include any suitable number of leaf springs. In a preferred embodiment, leaf spring 1450 may be made of a material that is reactive in the presence of a magnetic field.

Figure 35:
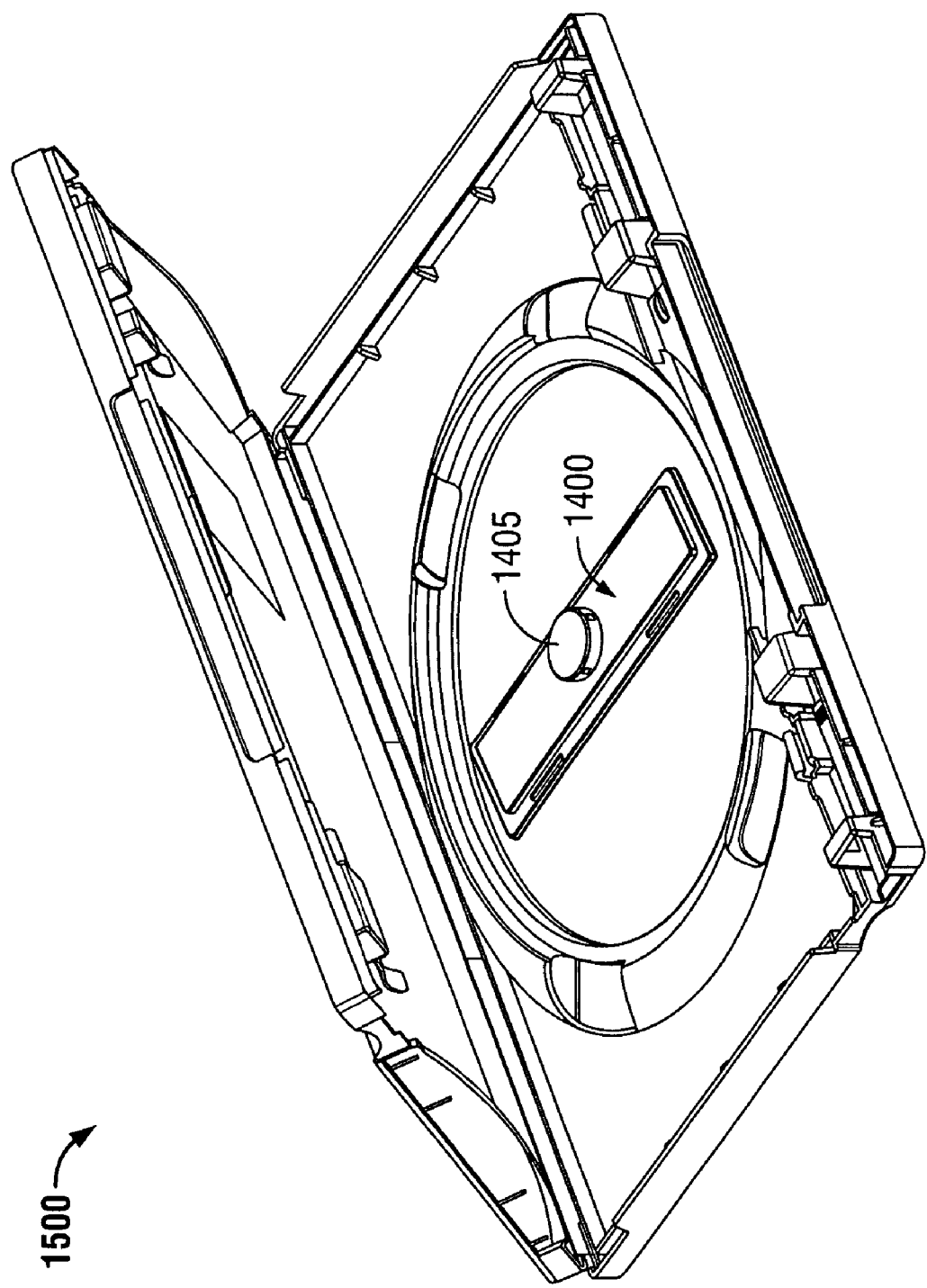
FIG. 35 is a perspective view of an illustrative container for storage media and the benefit denial device of FIG. 32 in accordance with the present invention.

Base member 1490 may include a plurality of slots 1496. Any number, pattern, or type of suitable slots may be present in base 1490 to affix base 1490 to a container such as container 1500 (FIG. 35). Cover member 1480 may include a plurality of slots 1486. Any number, pattern, or type of suitable slots may be present in cover 1480 to affix cover 1480 to a container such as container 1500 (FIG. 35).

As shown in FIG. 35, device 1400 may be coupled to an illustrative container for storage media 1500 in accordance with the present invention. Preferably, device 1400 is snapped into container 1500 such that protrusions of container 1500 (not shown) are received within slots 1486 and 1496 of device 1400. Alternatively, device 1400 may be coupled to container 1500 using, for example, heat staking or any other suitable method.

Figure 36:
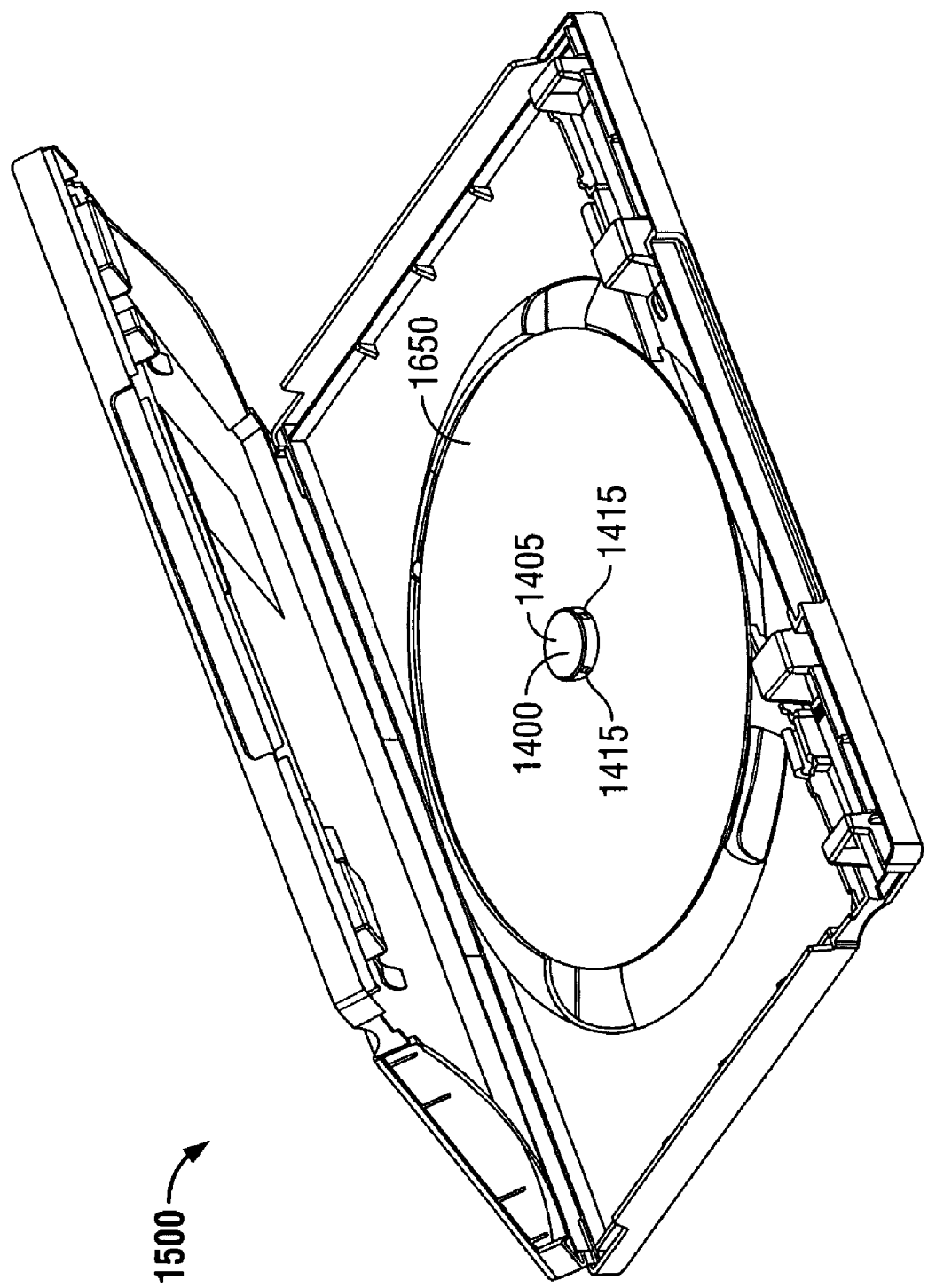
FIG. 36 is a perspective view of the assembly of FIG. 35 and an illustrative storage medium in accordance with the present invention.

FIG. 36 shows container 1500 with disc 1650 placed in container 1500 over hub portion 1405 of device 1400. To place disc 1650 in container 1500, device 1400 is in an unlocked position. Once disc 1650 is placed on hub portion 1415, an illustrative key arrangement may be used such that device 1400 is in the locked position.

It will be understood that the foregoing is only illustrative of the principles of the present invention, and that still other modifications can be made by those skilled in the art without departing from the scope and spirit of the invention. For example, the features described in connection with particular benefit denial devices may be present in some or all of the other benefit denial devices described herein.

What is claimed is:

1. A device for securing an asset within a container, comprising:
   a base member comprising a first portion configured to be coupled to the container and a second portion that extends from the first portion; and
   a locking member, wherein the locking member is configured to engage the second portion of the base member such that the asset is secured between the base member and the locking member, and wherein a portion of the locking member is configured to be acted upon by an applied force such that the locking member disengages the second portion of the base member;
   wherein:
   the second portion of the base member comprises a plurality of receptacles,
   the locking member comprises a plurality of latches that are each configured to be received within a receptacle of the plurality of receptacles such that the asset is secured between the base member and the locking member, and
   the plurality of latches are constructed from a magnetically attractable material.

2. A method for securing an asset within a container, comprising:
   providing a device for securing the asset, comprising:
      a base member comprising a first portion and a second portion that extends from the first portion; and
      a locking member, wherein a portion of the locking member is configured to be acted upon by an applied force such that the locking member disengages the second portion of the base member;
   coupling the first portion of the base member to the container;
   placing the asset in engagement with the base member; and
   engaging the second portion of the base member with the locking member such that the asset is secured between the base member and the locking member, wherein:
   the second portion of the base member comprises a plurality of receptacles, the locking member comprises a plurality of latches,
   engaging the second portion of the base member with the locking member further comprises receiving each latch of the plurality of latches within a receptacle of the plurality of receptacles such that the asset is secured between the base member and the locking member, and
   the plurality of latches are constructed from a magnetically attractable material.

3. A method for removing an asset from within a container, comprising:
   providing a device for securing the asset, comprising:
      a base member comprising a first portion that is coupled to the container and a second portion that extends from the first portion; and
      a locking member, wherein the locking member is in engagement with the second portion of the base member such that the asset is secured between the base member and the locking member, wherein:
      the second portion of the base member comprises a plurality of receptacles,
      the locking member comprises a plurality of latches that are each received within a receptacle of the plurality of receptacles such that the asset is secured between the base member and the locking member, and
      the plurality of latches are constructed from a magnetically attractable material; and
   acting upon a portion of the locking member with an applied force such that the locking member disengages the second portion of the base member.

* * * * *